United States Patent
Ushiro

(10) Patent No.: US 12,324,073 B2
(45) Date of Patent: Jun. 3, 2025

(54) LUMINANCE ADJUSTMENT APPARATUS, LUMINANCE ADJUSTMENT SYSTEM, AND LUMINANCE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 284 days.

(21) Appl. No.: 18/247,574

(22) PCT Filed: Jul. 27, 2021

(86) PCT No.: PCT/JP2021/027626
§ 371 (c)(1),
(2) Date: Mar. 31, 2023

(87) PCT Pub. No.: WO2022/074901
PCT Pub. Date: Apr. 14, 2022

(65) Prior Publication Data
US 2023/0422382 A1    Dec. 28, 2023

(30) Foreign Application Priority Data
Oct. 6, 2020    (JP) .................................. 2020-169224

(51) Int. Cl.
H05B 47/16       (2020.01)
H05B 47/165      (2020.01)
H05B 47/18       (2020.01)

(52) U.S. Cl.
CPC ........... *H05B 47/16* (2020.01); *H05B 47/165* (2020.01); *H05B 47/18* (2020.01)

(58) Field of Classification Search
CPC ....... H05B 47/16; H05B 47/18; H05B 47/165
See application file for complete search history.

(56) References Cited

FOREIGN PATENT DOCUMENTS

| JP | 2002-101075 A | 4/2002 | |
|---|---|---|---|
| JP | 2011-063187 A | 3/2011 | |
| WO | WO-2010029628 A1 * | 3/2010 | ......... H05B 37/0227 |

OTHER PUBLICATIONS

International Search Report, Application No. PCT/JP2021/027626, mailed Sep. 14, 2021. ISA/Japan Patent Office.

* cited by examiner

*Primary Examiner* — Henry Luong
(74) *Attorney, Agent, or Firm* — Honigman LLP

(57) ABSTRACT

An individual ECU (luminance adjustment apparatus) adjusts a luminance value of a lamp. The individual ECU adjusts the luminance value of the lamp according to a luminance pattern in which luminance values are indicated in keeping with elapsed time in one cycle. The individual ECU acquires a synchronization count value (or "time value") relating to the luminance pattern and changes an adjustment count value (or "actual value") of the elapsed time in one cycle based on the acquired synchronization count value.

14 Claims, 16 Drawing Sheets

Duty Ratio Table

| Adjustment Count Value | Duty Ratio (Luminance Value) |
|---|---|
| 0 | ... |
| 1 | ... |
| 2 | ... |
| 3 | ... |
| ⋮ | ⋮ |
| Nc−1 | ... |

Threshold Table

| Load Value (%) Of Communication Line | Threshold |
|---|---|
| 0~20 | ... |
| 20~40 | ... |
| 40~60 | ... |
| 60~80 | ... |
| 80~100 | ... |

Small ↑ ↓ Large

LUMINANCE ADJUSTMENT APPARATUS, LUMINANCE ADJUSTMENT SYSTEM, AND LUMINANCE

CROSS-REFERENCE TO RELATED APPLICATIONS

This application is the U.S. national stage of PCT/JP2021/027626 filed on Jul. 27, 2021, which claims priority of Japanese Patent Application No. JP 2020-169224 filed on Oct. 6, 2020, the contents of which are incorporated herein.

TECHNICAL FIELD

The present disclosure relates to a luminance adjustment apparatus, a luminance adjustment system, and a luminance adjustment method.

BACKGROUND

JP 2002-101075A discloses a first luminance adjustment apparatus and a second luminance adjustment apparatus as vehicle-mounted luminance adjustment apparatuses that adjust the luminance values of lamps. The first luminance adjustment apparatus repeatedly and alternately turns on and off a first lamp. When the first lamp is turned on, the first luminance adjustment apparatus transmits a signal instructing the second luminance adjustment apparatus to light the second lamp via a communication line. When the first lamp is turned off, the first luminance adjustment apparatus transmits a signal instructing the second luminance adjustment apparatus to turn off the second lamp via the communication line. The second luminance adjustment apparatus repeatedly turns the second lamp on and off according to the instructions in the signals received from the first luminance adjustment apparatus.

In JP 2002-101075A, the first luminance adjustment apparatus needs to transmit a signal via a communication line every time the first lamp is turned on or turned off. As a configuration for solving this problem, a configuration where the first luminance adjustment apparatus transmits a signal indicating flashing of the second lamp to the second luminance adjusting device would be conceivable. With this configuration, when the second luminance adjustment apparatus has received a signal from the first luminance adjustment apparatus, the second luminance adjustment apparatus will repeatedly turn the second lamp on and off in the same way as the first luminance adjustment apparatus. It would therefore become unnecessary for the first luminance adjustment apparatus to transmit a signal to the second luminance adjustment apparatus via the communication line every time the first lamp is turned on or turned off.

However, with this configuration, as time passes, the timing at which the first lamp and the second lamp turn on or off will typically become increasingly out of sync. Accordingly, the second luminance adjustment apparatus needs to appropriately synchronize with the first luminance adjustment apparatus regarding adjustment of the luminance value of the second lamp.

SUMMARY

It is an object of the present disclosure to provide a luminance adjustment apparatus, a luminance control system, and a luminance control method capable of achieving synchronization regarding adjustment of the luminance values of lamps.

A luminance adjustment apparatus according to one aspect of the present disclosure adjusts a luminance value of a lamp and includes a processing unit that executes a process, wherein the processing unit adjusts the luminance value of the lamp according to a luminance pattern in which luminance values are indicated in keeping with elapsed time in one cycle, acquires a time value relating to the luminance pattern, and changes an actual value of the elapsed time based on the acquired time value.

A luminance adjustment system according to another aspect of the present disclosure includes: a plurality of luminance adjustment apparatuses configured to adjust luminance values of lamps; and a transmission apparatus configured to transmit a time value, which relates to a luminance pattern in which luminance values are indicated in keeping with elapsed time in one cycle, to the plurality of luminance adjustment apparatuses, wherein each luminance adjustment apparatus includes a processing unit configured to execute processing, and the processing unit in each luminance adjustment apparatus adjusts the luminance value of lamps corresponding to the luminance adjustment apparatus out of the plurality of lamps according to the luminance pattern, acquires the time value transmitted by the transmission apparatus, and changes an actual value of the elapsed time based on the acquired time value.

A luminance adjustment method according to another aspect of the present disclosure adjusts the luminance of a lamp, the method having a computer execute: a step of adjusting the luminance value of the lamp according to a luminance pattern in which luminance values are indicated in keeping with elapsed time in one cycle; a step of acquiring a time value relating to the luminance pattern; and a step of changing an actual value of the elapsed time based on the acquired time value.

It should be noted that the present disclosure can be realized not only as a luminance adjustment apparatus with a processing unit with the characteristics described above, but also as a luminance adjustment method including the characteristic processing as steps, or as a computer program for causing a computer to execute such steps. Also, the present disclosure can be implemented as a semiconductor integrated circuit that realizes part or all of the luminance adjustment apparatus or as a luminance adjustment system including a luminance adjustment apparatus.

Effect of the Disclosure

According to the present disclosure, it is possible to achieve synchronization regarding adjustment of the luminance values of lamps.

DETAILED DESCRIPTION OF PREFERRED EMBODIMENTS

Figure 1:
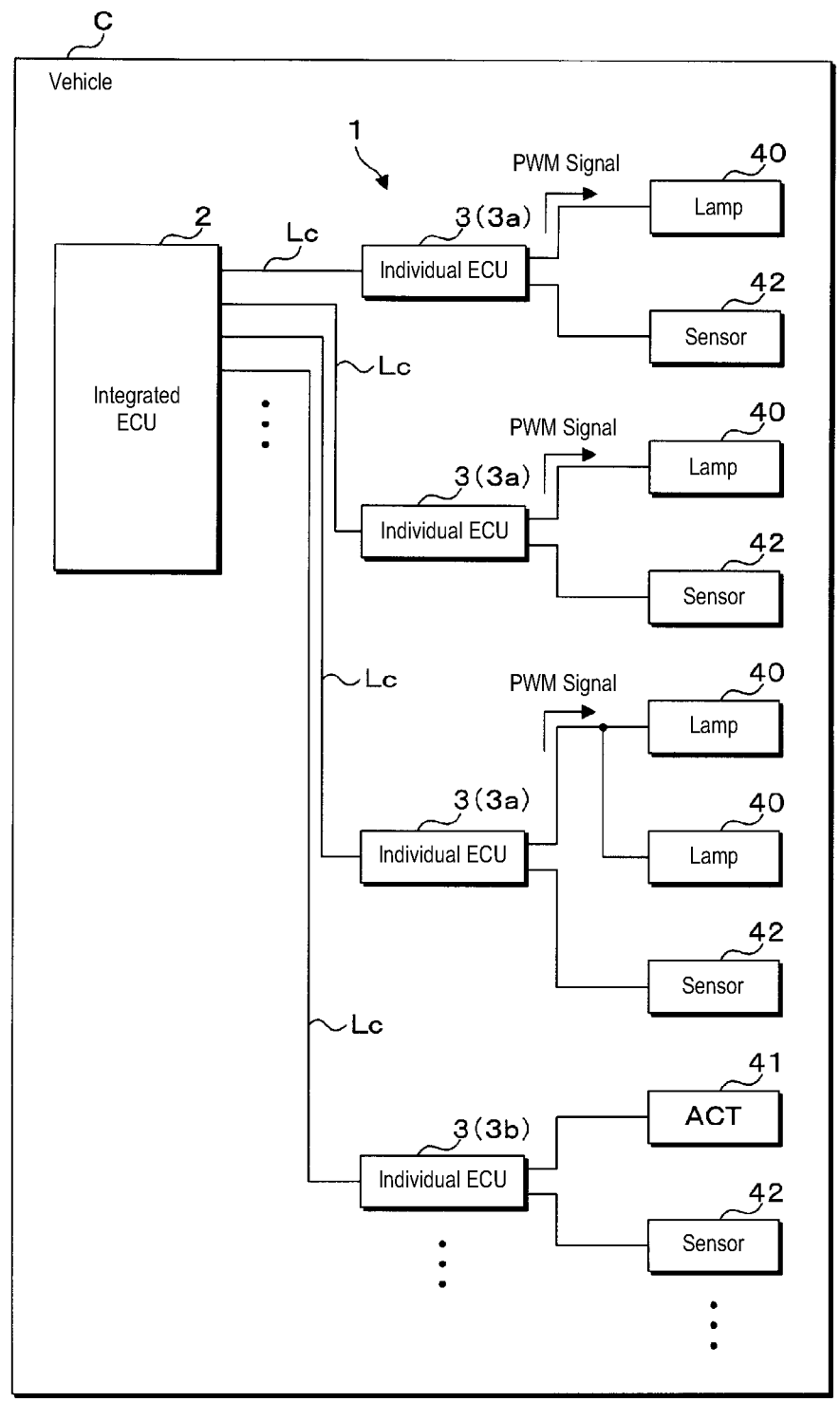
FIG. 1 is a block diagram depicting the configuration of a principal part of a control system according to a first embodiment.

Several embodiments of the present disclosure will first be listed and described in outline. At least some of the embodiments described below may be freely combined.

First Aspect

In accordance with a first aspect, a luminance adjustment apparatus according to the present disclosure adjusts a luminance value of a lamp and includes a processing unit configured to execute a process, wherein the processing unit adjusts the luminance value of the lamp according to a luminance pattern in which luminance values are indicated in keeping with elapsed time in one cycle, acquires a time value relating to the luminance pattern, and changes an actual value of the elapsed time based on the acquired time value.

Second Aspect

In a second aspect, the luminance adjustment apparatus according to an aspect of the present disclosure, the processing unit determines whether a difference between the acquired time value and the actual value is equal to or greater than a threshold and changes, when it has been determined that the difference is equal to or greater than the threshold, the actual value based on the acquired time value.

Third Aspect

In a third aspect, the luminance adjustment apparatus according to an aspect of the present disclosure, the processing unit acquires the time value that has been transmitted via a communication line, and the higher a load value of the communication line, the larger the threshold.

Fourth Aspect

In a fourth aspect, the luminance adjustment apparatus according to an aspect of the present disclosure, the processing unit determines whether a first luminance value corresponding to the acquired time value differs to a second luminance value corresponding to the actual value, decides, when it has been determined that the first luminance value differs to the second luminance value, a second time value of the elapsed time, changes luminance values in the luminance pattern from the acquired time value to just before the decided second time value, and changes the actual value to the acquired time value.

Fifth Aspect

In a fifth aspect, the luminance adjustment apparatus according to an aspect of the present disclosure, the processing unit decides, when it has been determined that the first luminance value differs to the second luminance value and the acquired time value exceeds the actual value, the second time value at a larger value than the acquired time value, and changes luminance values in the luminance pattern from the acquired time value to just before the second time value so that the luminance value of the lamp gradually reaches a luminance value at the second time value from the luminance value of the acquired time value.

Sixth Aspect

In a sixth aspect, the luminance adjustment apparatus according to an aspect of the present disclosure, the processing unit decides, when it has been determined that the first luminance value differs to the second luminance value and the acquired time value is below the actual value, the second time value at the actual time value, and changes luminance values in the luminance pattern from the acquired time value to just before the second time value to the luminance value at the actual value.

Seventh Aspect

In a seventh aspect, the luminance adjustment apparatus according to an aspect of the present disclosure, the processing unit repeatedly adjusts the luminance value of the lamp according to the luminance pattern, and changes, based on the time value, the actual value so as to change timing at which one cycle of the luminance pattern ends.

Eighth Aspect

In an eighth aspect, a luminance adjustment system according to an aspect of the present disclosure includes: a plurality of luminance adjustment apparatuses configured to adjust luminance values of lamps; and a transmission apparatus configured to transmit a time value, which relates to a luminance pattern in which luminance values are indicated in keeping with elapsed time in one cycle, to the plurality of luminance adjustment apparatuses, wherein each luminance adjustment apparatus includes a processing unit configured to execute processing, and the processing unit in each luminance adjustment apparatus adjusts the luminance value of lamps corresponding to that luminance adjustment apparatus out of the plurality of lamps according to the luminance pattern, acquires the time value transmitted by the transmission apparatus, and changes an actual value of the elapsed time based on the acquired time value.

Ninth Aspect

In a ninth aspect, a luminance adjustment method according to the present disclosure adjusts the luminance of a lamp and causes a computer to execute: a step of adjusting the luminance value of the lamp according to a luminance pattern in which luminance values are indicated in keeping with elapsed time in one cycle; a step of acquiring a time value relating to the luminance pattern; and a step of changing an actual value of the elapsed time based on the acquired time value.

In the luminance adjustment apparatus and the luminance adjustment method according to any of the first to the ninth aspects, the luminance value of the lamp(s) is adjusted according to a luminance pattern. Flashing of the lamp(s) is realized by adjusting the luminance values of the lamp(s) to luminance values corresponding to the actual value of the elapsed time in one cycle of the luminance pattern. By changing the actual value based on a time value acquired from outside, synchronization relating to the adjustment of the luminance value of the lamp(s) can be realized.

In the luminance adjustment apparatus according to the above aspect, the actual value is changed when the difference between the time value and the actual value is equal to or more than a threshold.

In the luminance adjustment apparatus according to the above aspect, when the load value of the communication line is large, a long time is taken from the transmission of the time value until the acquisition of the time value. For this reason, the higher the load value of the communication line, the lower the reliability of the time value. Accordingly, the higher the load value of the communication line, the larger the threshold value in use. As a result, when the load value of the communication line is high, there is low probability that the actual value will be changed.

In the luminance adjustment apparatus according to the above aspect, luminance values of the luminance pattern from the time value to just before the second time value are changed. For this reason, the luminance value of the lamp returns to the luminance value of the luminance pattern before the change without greatly changing.

In the luminance adjustment apparatus according to the above aspect, the luminance value of the lamp gradually reaches the luminance value for the restoration value from the luminance value for the actual value. For this reason, the luminance value of the lamp returns to the luminance value of the luminance pattern before the change without greatly changing.

In the luminance adjustment apparatus according to the above aspect, the luminance value of the lamp is maintained, from the time at which the actual value is changed until the restoration value is reached, at the luminance value for the actual value at the point where the time value was acquired. For this reason, the luminance value of the lamp returns to the luminance value of the luminance pattern before the change without greatly changing.

In the luminance adjustment apparatus according to the above aspect, synchronization relating to the adjustment of the luminance value of lamps is realized by adjusting the timing at which one cycle of the luminance pattern ends.

In the luminance adjustment system according to the above aspect, the transmission apparatus transmits the time value to a plurality of luminance adjustment apparatuses. As a result, it is possible to realize synchronization for adjustments performed by the plurality of luminance adjustment apparatuses.

Specific embodiments of a control system (luminance adjustment system) according to the present disclosure are described below with reference to the drawings. It should be noted that the present disclosure is not limited to the examples described here, and is instead indicated by the range of the patent claims and is intended to include all modifications within the meaning and scope of the patent claims and their equivalents.

First Embodiment

Configuration of Control System

FIG. 1 is a block diagram depicting the configuration of a principal part of a control system 1 according to the first embodiment. The control system 1 is installed in a vehicle C. The control system 1 includes an integrated ECU (Electronic Control Unit) 2, a plurality of individual ECUs 3, four lamps 40, an actuator 41, and four sensors 42. The lamps 40 are LEDs (Light Emitting Diodes), incandescent light bulbs, or the like. The plurality of individual ECUs 3 include individual ECUs 3a connected to the lamps 40 and an individual ECU 3b connected to the actuator 41. In the example in FIG. 1, the number of individual ECUs 3a is three, and the number of individual ECUs 3b is one.

The number of individual ECUs 3a is not limited to three, and may also be two or four or more. The number of individual ECUs 3b is not limited to one, and may also be two or more. The control system 1 does not need to include an individual ECU 3b.

An example where the number of individual ECUs 3a is three and the number of individual ECUs 3b is one is described below.

Figure 2:
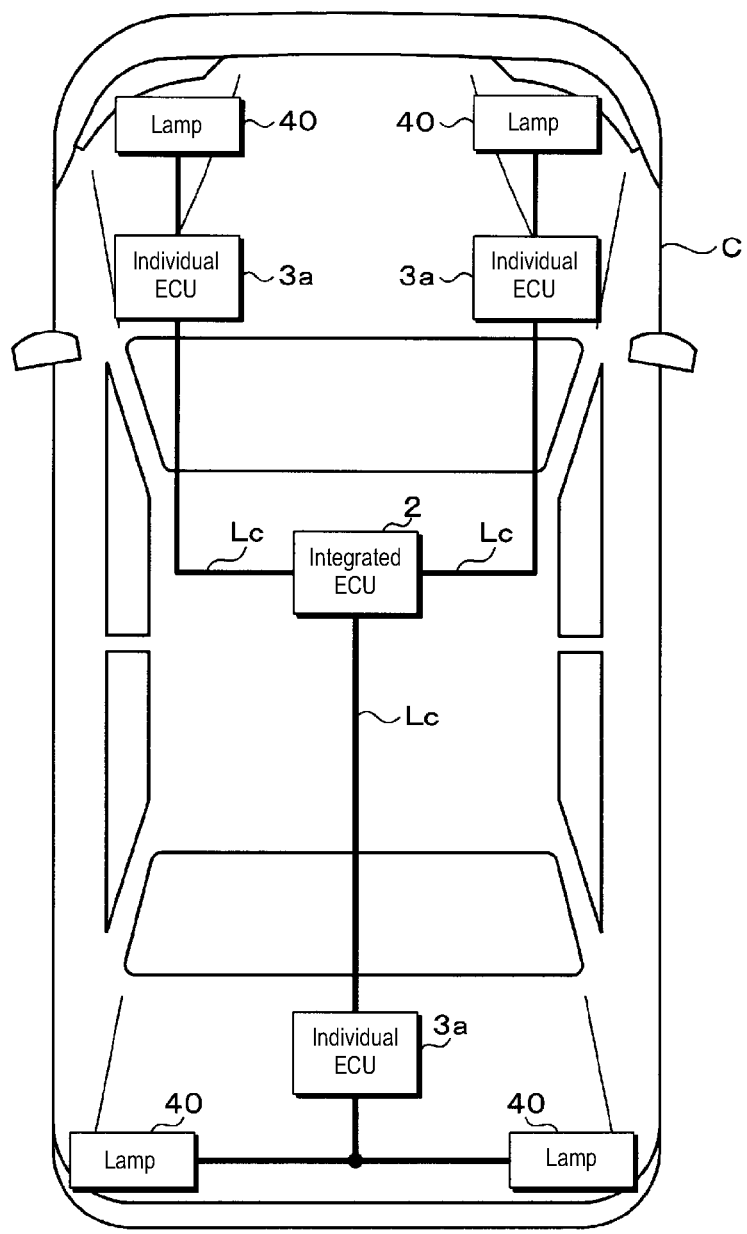
FIG. 2 is a diagram useful in explaining the layout of an integrated ECU, individual ECUs, and lamps.

FIG. 2 is a diagram useful in explaining the layout of the integrated ECU 2, the individual ECUs 3a, and the lamps 40. Two of the lamps 40 are disposed with one lamp 40 on the left front side of the vehicle C and another on the right front side. The remaining two lamps 40 are disposed on the left rear side and the right rear side of the vehicle C. The two lamps 40 located at the rear of the vehicle C are connected to each other. The lamps 40 are flashing lamps. As one example, the four lamps 40 are hazard lamps.

Two of the individual ECUs 3a are disposed corresponding to and in the vicinity of the two lamps 40 disposed at the front of the vehicle C. Each of these individual ECUs 3a is connected to the lamp 40 disposed near that individual ECU 3a. The remaining individual ECU 3a is disposed in the vicinity of the two lamps 40 disposed at the rear of the vehicle C. This individual ECU 3a is connected to a connection node between the two lamps 40. The integrated ECU 2 is disposed in the center of the vehicle C. The integrated ECU 2 is separately connected to each of the three individual ECUs 3a by three communication lines Lc.

As depicted in FIG. 1, the actuator 41, which differs from the lamps 40, is connected to the individual ECU 3b. Sensors 42 are further connected to each of the three individual ECUs 3a and the one individual ECU 3b. The integrated ECU 2 is further connected to the individual ECU 3b by a communication line La. Note that the individual ECU 3b, the actuator 41, and the four sensors 42 have been omitted from FIG. 2.

Each sensor 42 repeatedly acquires vehicle data relating to the vehicle C. The vehicle data indicates acceleration of the vehicle C, luminance in the vicinity of the vehicle C, whether it is raining, the states of switches operated by occupants of the vehicle C, images of the periphery of the vehicle C, and the like. Every time vehicle data is acquired, each sensor 42 outputs the acquired vehicle data to the individual ECU 3 connected to that sensor. When vehicle data has been inputted from a sensor 42, each individual ECU 3 transmits the inputted vehicle data to the integrated ECU 2.

The integrated ECU 2 decides the operation of the lamps 40 or the actuator 41 based on one or more vehicle data received from one or more of the individual ECUs 3. The integrated ECU 2 transmits instruction data indicating the decided operation to one or a plurality of individual ECUs 3. The instruction data transmitted to an individual ECU 3a indicates a start or end of flashing of a lamp 40. The instruction data transmitted to the individual ECU 3b indicates operation of the actuator 41.

When each individual ECU 3a has received instruction data indicating the start of flashing of the lamps 40, that individual ECU 3a outputs a PWM (Pulse Width Modulation) signal to one or a plurality of lamps 40 and adjusts the duty ratio of the PWM signal. By doing so, the lamp 40 starts flashing. Each individual ECU 3a stops the outputting of the PWM signal on receiving instruction data indicating an end of flashing of the lamps 40. As a result, the one or more lamps stop flashing.

When the individual ECU 3*b* has received instruction data indicating an operation of the actuator 41, the individual ECU 3*b* transmits a control signal for causing the actuator 41 to execute the operation indicated by the received instruction data to the actuator 41. As a result, the actuator 41 performs the operation indicated by the instruction data received by the individual ECU 3*b*.

For communication between the integrated ECU 2 and the individual ECUs 3, as one example, Ethernet (registered trademark) communication protocol is used.

Relationship Between Duty Ratio of PWM Signal and Luminance Value of Lamps 40

Figure 3:
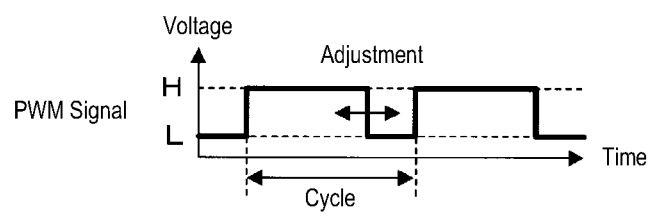
FIG. 3 is a diagram useful in explaining the relationship between the duty ratio of a PWM signal and a luminance value of a lamp.
Figure 3:
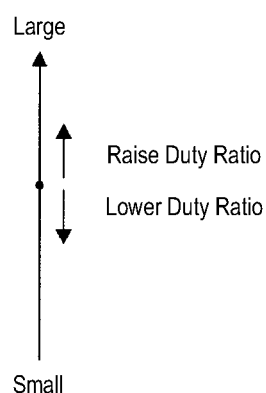

FIG. 3 is a diagram useful in explaining the relationship between the duty ratio of the PWM signal and the luminance value of the lamps 40. The upper part of FIG. 3 indicates the waveform of a PWM signal. The lower part of FIG. 3 indicates the relationship between the duty ratio of the PWM signal and the luminance value of the lamps 40. As depicted in the upper part of FIG. 3, the PWM signal exhibits a high level voltage or a low level voltage. In FIG. 3, the high level voltage and the low level voltage are indicated by "H" and "L", respectively. The voltage indicated by the PWM signal cyclically switches from the low level voltage to the high level voltage. During one cycle, the voltage exhibited by the PWM signal switches from the high level voltage to the low level voltage.

The "duty ratio" of the PWM signal is the ratio occupied by the period in which the PWM signal exhibits the high level voltage during one cycle. The duty ratio is expressed by a value that is greater than or equal to zero and less than or equal to 1. Each individual ECU 3*a* adjusts the duty ratio of the PWM signal by adjusting the timing at which the voltage exhibited by the PWM signal switches from the high level voltage to the low level voltage.

Note that when the duty ratio is zero, the voltage exhibited by the PWM signal is maintained at the low level voltage throughout one cycle. When the duty ratio is one, the voltage exhibited by the PWM signal is maintained at the high level voltage throughout one cycle.

A lamp 40 lights while the PWM signal exhibits the high level voltage. The lamp 40 is turned off while the PWM signal exhibits the low level voltage. Since the period of the PWM signal is short, the luminance value of a lamp 40 perceived by a person is expressed by the average value of the luminance value of the lamp 40 in one cycle. The higher the duty ratio of the PWM signal, the longer the period during which the lamp 40 is lit in one cycle. This means that the higher the duty ratio of the PWM signal, the higher the luminance value of the lamp 40 perceived by a person.

The luminance value of the lamp 40 depicted in FIG. 3 is the luminance value of the lamp 40 perceived by a person. In the following description, the luminance value of the lamp 40 perceived by a person is simply referred to as "the luminance value of the lamp 40". As depicted at the bottom of FIG. 3, the luminance value of the lamp 40 increases as the duty ratio increases. Likewise, the luminance value of the lamp 40 decreases when the duty ratio decreases. Each individual ECU 3*a* adjusts the luminance value of a lamp or lamps 40 by adjusting the duty ratio of the PWM signal. Each individual ECU 3*a* functions as a luminance adjustment apparatus.

Note that the PWM signal may be a signal that periodically switches from the high level voltage to the low level voltage. In this case, the individual ECU 3*a* adjusts the duty ratio of the PWM signal by adjusting the timing at which the voltage exhibited by the PWM signal switches from the low level voltage to the high level voltage.

Configuration of Integrated ECU 2

Figure 4:
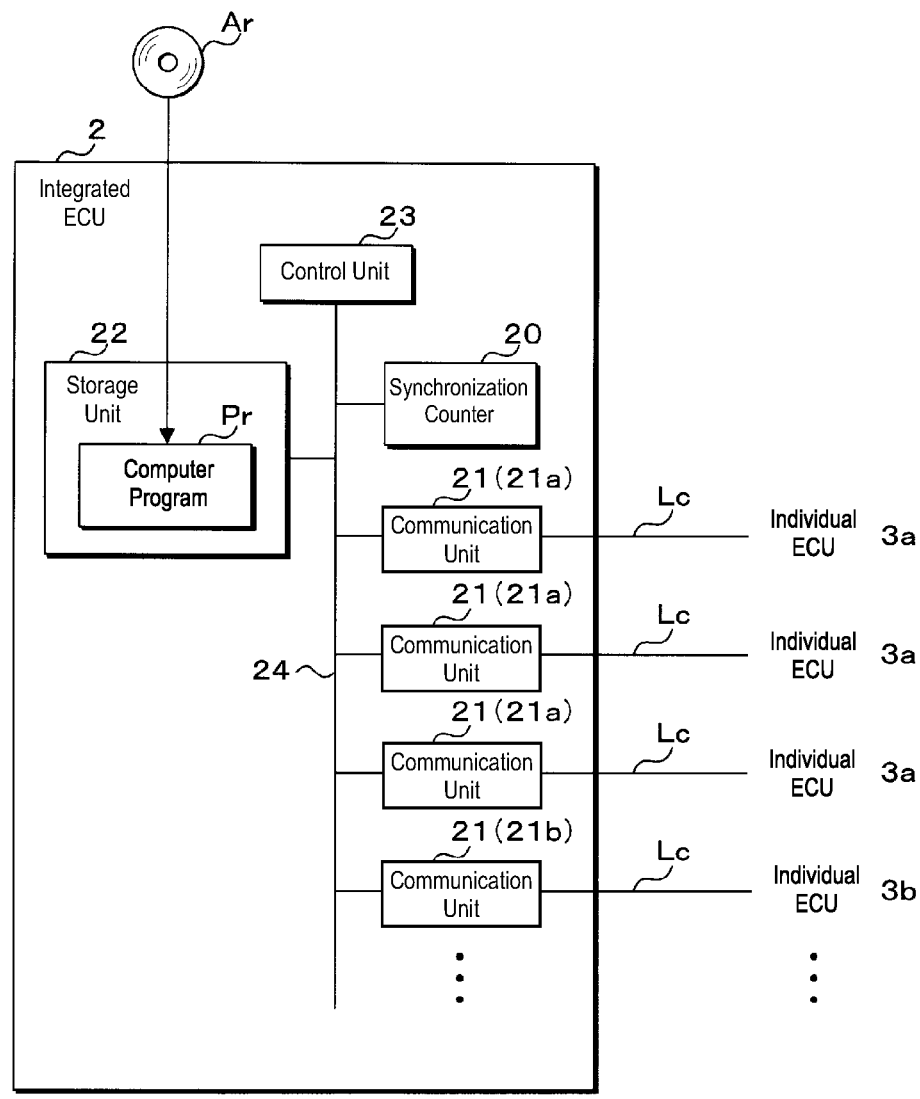
FIG. 4 is a block diagram depicting the configuration of a principal part of the integrated ECU.

FIG. 4 is a block diagram depicting the configuration of a principal part of the integrated ECU 2. The integrated ECU 2 includes a synchronization counter 20, a plurality of communication units 21, a storage unit 22, and a control unit 23. These components are connected to an internal bus 24. Each communication unit 21 is further connected to an individual ECU 3 by a communication line Lc. The plurality of communication units 21 include communication units 21*a* that are connected to the individual ECUs 3*a* and a communication unit 21*b* connected to the individual ECU 3*b*. The number of communication units 21*a* is the same as the number of individual ECUs 3*a*, that is, three. The number of communication units 21*b* is the same as the number of individual ECUs 3*b*, that is, one.

A synchronization count value is stored in the synchronization counter 20. The synchronization counter 20 increments the synchronization count value by 1 each time a certain count cycles elapses. The synchronization count value is a measurement value for the time measured by the synchronization counter 20. The control unit 23 instructs the synchronization counter 20 to start a count. At this time, the synchronization counter 20 increases the synchronization count value by 1 from zero. An integer of 2 or more is expressed as "Nc". The synchronization counter 20 changes the synchronization count value to zero when a count cycle has elapsed in a state where the synchronization count value is at (Nc−1). Accordingly, the entire period of the synchronization count value is expressed as "Nc·(count cycle)", where "·" represents multiplication.

The control unit 23 reads the synchronization count value from the synchronization counter 20. The control unit 23 instructs the synchronization counter 20 to end the count. At this time, the synchronization counter 20 ends the count, that is, the incrementing of the synchronization count value. The synchronization count value is used to perform synchronization relating to adjustment of the luminance values of the plurality of lamps 40. This synchronization is performed by the respective individual ECUs 3*a*.

Each communication unit 21 repeatedly receives vehicle data from the individual ECU 3 to which that communication unit 21 is connected. The vehicle data received by each communication unit 21 is acquired by the control unit 23. Each communication unit 21*a* transmits, according to the instruction of the control unit 23, instruction data indicating the start or end of flashing of a lamp or lamps and synchronization data indicating the synchronization count value to the individual ECU 3*a* connected to that communication unit 21*a*. The communication unit 21*b* transmits, according to the instruction of the control unit 23, instruction data indicating the operation of the actuator 41 to the individual ECU 3*b* connected to that communication unit 21*b*.

The storage unit 22 is a non-volatile memory. Accordingly, the data stored in the storage unit 35 is retained regardless of whether power is supplied to the integrated ECU 2. A computer program Pr is stored in the storage unit 22. The control unit 23 has a processing element that executes processing. The processing element of the control unit 23 executes an actuator control process, a lamp control process, and the like by executing this computer program Pr. The actuator control process is processing for controlling the operation of the actuator 41. The lamp control process is processing for controlling the operation of the four lamps 40.

Note that the computer program Pr may be stored in a non-temporary storage medium Ar which can be read by the processing element of the control unit 23. In this case, the computer program Pr read from the storage medium Ar by a reading apparatus (not illustrated) is written into the storage unit 22. The storage medium Ar is an optical disc, a flexible disk, a magnetic disk, a magneto-optical disc, a semiconductor memory, or the like. Optical discs include CD (Compact Disc)-ROM (Read Only Memory), DVD (Digital Versatile Disc)-ROM, and BD (Blu-ray (registered trademark) Discs). Magnetic disks include hard disks, for example. The computer program Pr may be downloaded from an external device (not illustrated) connected to a communication network (not illustrated), and the downloaded computer program Pr may be written into the storage unit 22.

The number of processing elements provided in the control unit 23 is not limited to one, and may also be two or more. When the number of processing elements provided in the control unit 23 is two or more, a plurality of processing elements may cooperate to execute the actuator control process, the lamp control process, and the like.

Actuator Control Process

The control unit 23 determines whether to operate the actuator 41 based on one or more vehicle data received from one or more individual ECUs 3. The control unit 23 waits for timing to operate the actuator 41 until it is determined to operate the actuator 41. When the control unit 23 has determined that the actuator 41 is to be operated, the control unit 23 decides the operation of the actuator 41. After this, the control unit 23 instructs the communication unit 21b to transmit instruction data indicating the decided operation to the individual ECU 3b. By doing so, the actuator 41 performs the operation decided by the control unit 23. After this, the control unit 23 ends the actuator control process. After ending the actuator control process, the control unit 23 executes the actuator control process again and waits for the timing to operate the actuator 41.

Lamp Control Process

Figure 5:
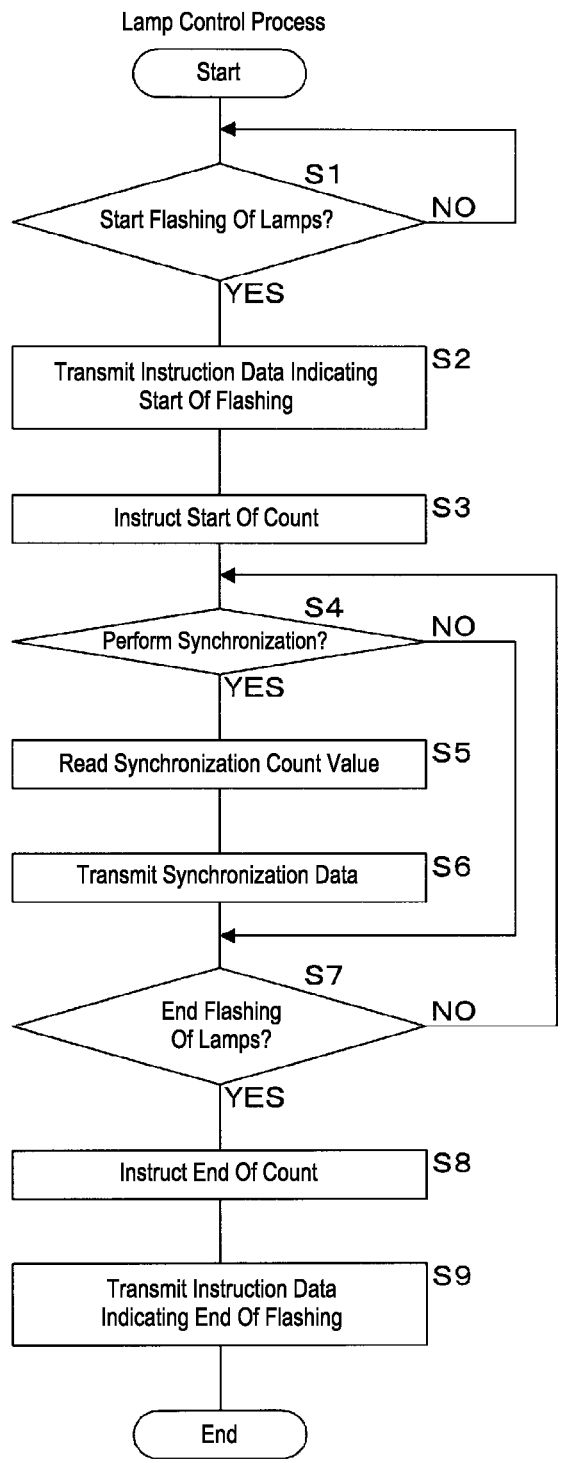
FIG. 5 is a flowchart depicting the procedure of a lamp control apparatus.

FIG. 5 is a flowchart depicting the procedure of the lamp control process. The control unit 23 determines whether to start flashing of the four lamps 40 based on the one or a plurality of vehicle data received by the one or a plurality of communication units 21 (step S1). When the four lamps 40 are hazard lamps, as one example, the control unit 23 determines to start flashing of the four lamps 40 when a hazard lamp switch has been switched on. When the control unit 23 determines to not start flashing of the four lamps 40 (S1: NO), the control unit 23 executes step S1 again and waits for the timing to start flashing of the four lamps 40.

When the control unit 23 has determined that the flashing of the four lamps 40 is to start (S1: YES), the control unit 23 instructs the four communication units 21a to send instruction data indicating the start of flashing of the lamps 40 to the four individual ECUs 3a (step S2). By doing so, each individual ECU 3a outputs a PWM signal to the one or more lamps 40 connected to that individual ECU 3a, and adjusts the duty ratio of the PWM signal to make the one or more lamps 40 flash. The control unit 23 does not adjust the luminance values of the four lamps 40.

After executing step S2, the control unit 23 instructs the synchronization counter 20 to start the count (step S3). As a result, the synchronization counter 20 increases the synchronization count value in increments of one from zero. After executing step S3, the control unit 23 determines whether to perform synchronization to adjust the luminance values of the four lamps 40 (step S4). As a first example of step S4, when a reception unit (not illustrated) has received a synchronization instruction from an occupant of the vehicle C, the control unit 23 determines that synchronization is to be performed. As a second example of step S4, when a certain period of time has elapsed since the execution of step S2, the control unit 23 determines that synchronization is to be performed.

When the control unit 23 has determined that synchronization is to be performed (S4: YES), the control unit 23 reads the synchronization count value from the synchronization counter 20 (step S5) and instructs the four communication units 21a to transmit four synchronization data indicating the read synchronization count value to the four individual ECUs 3a (step S6).

When the control unit 23 has determined that synchronization is not to be performed (S4: NO), or after executing step S6, the control unit 23 determines, based on one or a plurality of vehicle data received by one or a plurality of the communication units 21, whether to end the flashing of the lamps (step S7). When the four lamps 40 are hazard lamps, as one example, the control unit 23 determines to end the flashing of the four lamps 40 when the hazard lamp switch has been switched off. When the control unit 23 has determined to not end the flashing of the four lamps (S7: NO), the control unit 23 executes step S4. As described above, each of the four communication units 21a appropriately transmits synchronization data while the four lamps 40 are flashing.

When the control unit 23 has determined to end the flashing of the four lamps 40 (S7: YES), the control unit 23 instructs the synchronization counter 20 to end the count (step S8). As a result, the synchronization counter 20 ends the count. After executing step S8, the control unit 23 instructs the four communication units 21a to transmit instruction data indicating the end of flashing of the lamp(s) 40 to the four individual ECUs 3a (step S9). As a result, each individual ECU 3a stops outputting the PWM signal. By doing so, the four lamps 40 stop flashing.

The control unit 23 ends the lamp control process after executing step S9. After ending the lamp control process, the control unit 23 executes the lamp control process again, executes step S1 again, and waits for the timing to start flashing of the four lamps 40.

Configuration of Individual ECU 3a

Figures 6, 7:
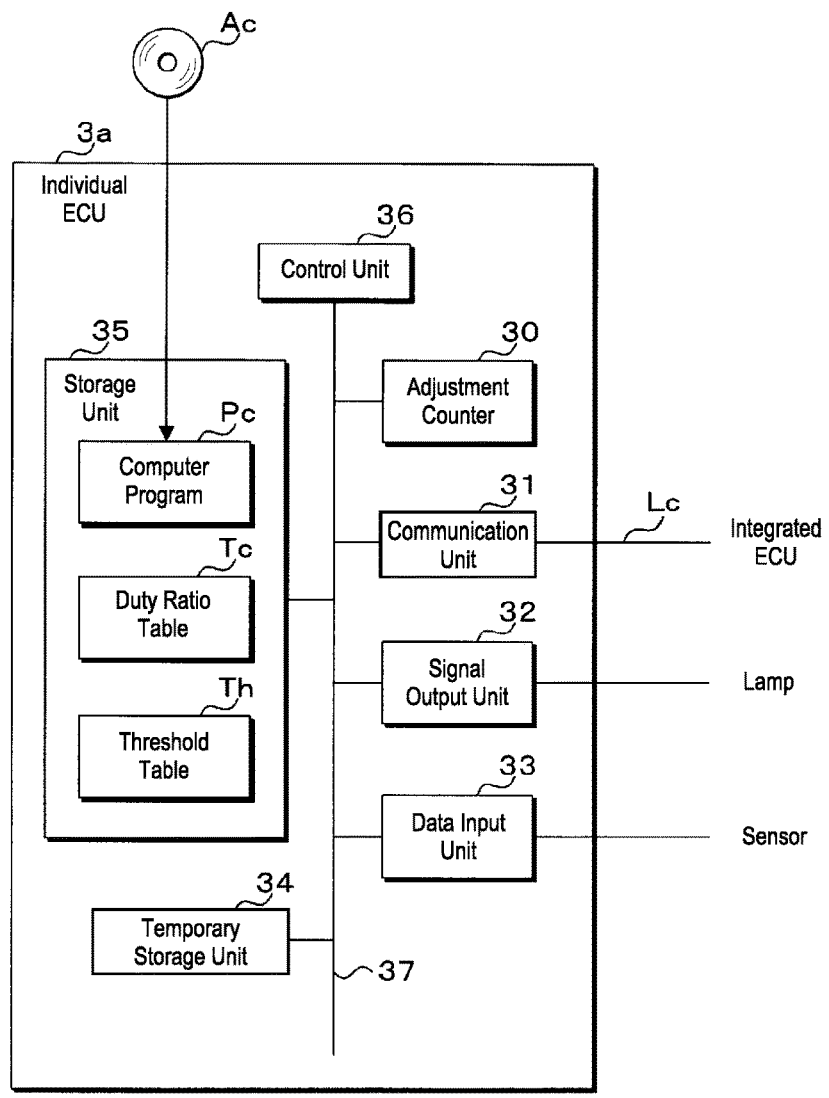
FIG. 6 is a block diagram depicting a configuration of a principal part of an individual ECU.
FIG. 7 is a table indicating contents of a duty ratio table.

FIG. 6 is a block diagram depicting a configuration of a principal part of an individual ECU 3a. The four individual ECUs 3a have the same configuration. Each individual ECU 3a includes an adjustment counter 30, a communication unit 31, a signal output unit 32, a data input unit 33, a temporary storage unit 34, a storage unit 35, and a control unit 36. These components are connected to an internal bus 37. The communication unit 31 is further connected by the communication line Lc to the integrated ECU 2. The signal output unit 32 is connected to one or more lamps 40. The data input unit 33 is further connected to a sensor 42.

The adjustment count value is stored in the adjustment counter 30. The adjustment counter 30 increments the adjustment count value by one every time a certain count cycles elapses. The adjustment count value is a measurement value expressing the time measured by the adjustment counter 30. The control unit 36 instructs the adjustment counter 30 to start the count. When this happens, the adjustment counter 30 increases the adjustment count value by one from zero. In the same way as the synchronization counter 20 of the integrated ECU 2, the adjustment counter 30 changes the adjustment count value to zero when a count cycle has passed in a state where the synchronization count value is at (Nc−1). Accordingly, the entire period of the synchronization count value is expressed as "Nc·(count cycle)", where " " represents a multiplication.

As mentioned earlier, the integer Nc is an integer that is two or higher. The integer Nc in the adjustment counter 30 is the same as the integer Nc in the synchronization counter 20 of the integrated ECU 2. The count cycles of the synchronization counter 20 and the adjustment counter 30 also match. Here, the expression "match" does not mean an exact match, but may also refer to a substantial match. When the difference between the two count cycles is within a margin of error, the two count cycles are regarded as substantially the same.

The control unit 36 reads the adjustment count value from the adjustment counter 30. The control unit 36 instructs the adjustment counter 30 to end the count. When this happens, the adjustment counter 30 ends the count, that is, the incrementing of the adjustment count value. The adjustment count value is used to adjust the luminance of one or a plurality of the lamps 40.

The communication unit 31 transmits vehicle data to the communication unit 21a of the integrated ECU 2 according to instructions by the control unit 36. The communication unit 31 receives instruction data and synchronization data. The control unit 36 acquires instruction data and synchronization data that were received by the communication unit 31.

The communication unit 31 periodically calculates the load value of the communication line Lc. As one example, the load value of the communication line Lc is represented by the ratio of a period during which data is being transmitted via the communication line Lc out of a certain predetermined period, or in other words, the usage ratio of the communication line Lc. As a first example of calculating the load value, the communication unit 31 calculates the usage ratio (or "load value") of the communication line Lc based on the voltage of the communication line Lc. The communication unit 31 includes a volatile temporary storage unit (not illustrated), and stores data to be transmitted via the communication line Lc in this temporary storage unit. The communication unit 31 sequentially transmits the data stored in the temporary storage unit via the communication line Lc. After transmitting the data, the communication unit 31 erases the data from the temporary storage unit. As a second example of calculating the load value, the communication unit 31 calculates the usage ratio (or "load value") of the communication line Lc based on the amount of data stored in the temporary storage unit.

The load value of the communication line Lc is stored in the temporary storage unit of the communication unit 31. Every time the communication unit 31 calculates the load value of the communication line Lc, the communication unit 31 updates the load value stored in the temporary storage unit to the calculated load value. When a load value is not stored in the temporary storage unit, the communication unit 31 writes the calculated load value into the temporary storage unit. The control unit 36 refers to the load value stored in the temporary storage unit of the communication unit 31.

Note that the load value may also be calculated by the control unit 36 instead of the communication unit 31.

The signal output unit 32 outputs a PWM signal to one or more lamps 40 according to an instruction from the control unit 36. The duty ratio is stored in the signal output unit 32. The signal output unit 32 adjusts the duty ratio of the PWM signal to the duty ratio internally stored in the signal output unit 32. The control unit 36 changes the duty ratio of the PWM signal by changing the duty ratio stored in the signal output unit 32. The signal output unit 32 stops the outputting of the PWM signal according to an instruction from the control unit 36.

Vehicle data is repeatedly inputted from the sensor 42 into the data input unit 33. The vehicle data inputted into the data input unit 33 is acquired by the control unit 36. The temporary storage unit 34 is a volatile memory. Accordingly, when the supplying of power to the individual ECU 3a is stopped, the data stored in the temporary storage unit 34 is erased. The control unit 36 writes data into the temporary storage unit 34. The data stored in the temporary storage unit 34 is read out by the control unit 36.

The storage unit 35 is a non-volatile memory. Accordingly, data stored in the storage unit 35 is retained regardless of whether power is supplied to the individual ECU 3a. The computer program Pc is stored in the storage unit 35. The control unit 36 has a processing element that executes processing, and functions as a processing unit. The processing element of the control unit 36 executes a vehicle data transmission process, a luminance adjustment process, a synchronization process, and the like by executing the computer program Pc. The vehicle data transmission process is a process of transmitting vehicle data to a communication unit 21a of the integrated ECU 2. The luminance adjustment process is a process for adjusting the luminance value of a lamp or lamps 40. The synchronization process is a process for synchronization relating to adjustment of the luminance values of the four lamps 40.

Note that the computer program Pc may also be stored in a non-temporary storage medium Ac so that the computer program Pc can be read by the processing element of the control unit 36. In this case, the computer program Pc that has been read from the storage medium Ac by a reader apparatus (not illustrated) is written in the storage unit 35. The storage medium Ac is an optical disc, a flexible disk, a magnetic disk, a magneto-optical disc, a semiconductor memory, or the like. The computer program Pc may also be downloaded from an external device (not illustrated) connected to a communication network (not illustrated), and the downloaded computer program Pc may be written into the storage unit 35.

The number of processing elements included in the control unit 36 is not limited to one, and may also be two or more. When the number of processing elements included in the control unit 36 is two or more, a plurality of the processing elements may cooperate to execute vehicle data transmission process, the luminance adjustment process, the synchronization process, and the like.

The control unit 36 of each individual ECU 3a executes the vehicle data transmission process, the luminance adjustment process, the synchronization process, and the like in the same way.

The storage unit 35 further stores a duty ratio table Tc used for adjusting luminance values. FIG. 7 is a table indicating the contents of the duty ratio table Tc. As depicted in FIG. 7, the duty ratios of the PWM signal respectively corresponding to Nc adjustment count values are stored in the duty ratio table Tc. As described earlier, when the duty ratio of the PWM signal has been decided, this decides the luminance value of the lamp(s) 40. For this reason, the duty ratio corresponds to a luminance value.

As described earlier, the adjustment counter 30 increments the adjustment count value by one every time a count cycle elapsed. This means that the adjustment count value corresponds to a time value of the elapsed time in one cycle. The duty ratio, that is, the luminance value of the lamp(s) 40 is adjusted according to the adjustment count value. The respective duty ratios for the Nc adjustment count values, that is, the luminance value of the lamp(s) 40 is set according to a luminance pattern in keeping with the elapsed time (or point in time) in one cycle.

Figures 8, 9:
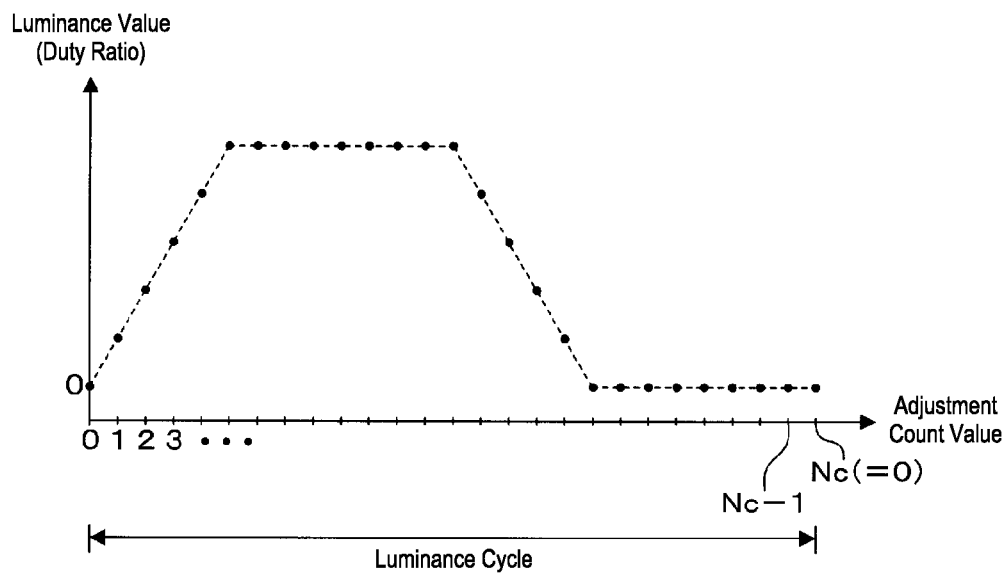
FIG. 8 is a graph of a luminance pattern.
FIG. 9 is a table indicating the content of a threshold table.

FIG. 8 is a graph of the luminance pattern. In FIG. 8, the graph of the luminance pattern is indicated by a broken line. For the graph of the luminance pattern, the adjustment count value is indicated on the horizontal axis. On the vertical axis, the duty ratio of the PWM signal is indicated as the luminance value of the lamp(s) 40. As described earlier, the adjustment count value is incremented by one every time the count cycle elapses, so that the horizontal axis corresponds to a time axis. In the luminance pattern, a first period, a second period, a third period, and a fourth period are provided. In the first period, the luminance value rises from zero with a constant gradient to a constant value. In the second period, the luminance value is maintained at the constant value. In the third period, the luminance value decreases with a constant gradient from the constant value to zero. In the fourth period, the luminance value is maintained at zero.

In the following description, one cycle of the luminance pattern will be referred to as the "luminance cycle". Since a period corresponding to one mark on the scale of the adjustment count value is the count cycle, the luminance cycle is expressed as Nc (count cycle). The adjustment count value is a time value of the elapsed time during the luminance cycle. Accordingly, in the luminance pattern, a luminance value in keeping with the elapsed time in the luminance cycle is indicated. The values of the duty ratio (luminance value) in the duty ratio table Tc depicted in FIG. 7 are set according to the luminance pattern. The plurality of duty ratio values indicated in the duty ratio table Tc are indicated by a plurality of black dots in FIG. 8.

The storage unit 35 further stores a threshold table Th indicating the relationship between the load value of the communication line Lc and a threshold. The threshold is used to determine whether to perform synchronization to adjust the luminance value of the lamp 40. The threshold is compared with the difference between the synchronization count value and the adjustment count value.

FIG. 9 is a table indicating the content of the threshold table Th. FIG. 9 depicts an example in which the load value of the communication line Lc is the usage ratio of the communication line Lc. Here, the unit of the load value is a percentage. In the threshold table Th, values of the threshold corresponding to the load value of the communication line Lc are indicated. The threshold is an integer that is 1 or more and Nc or less. The larger the load value, the larger the threshold is set.

Luminance Adjustment Process

Figure 10:
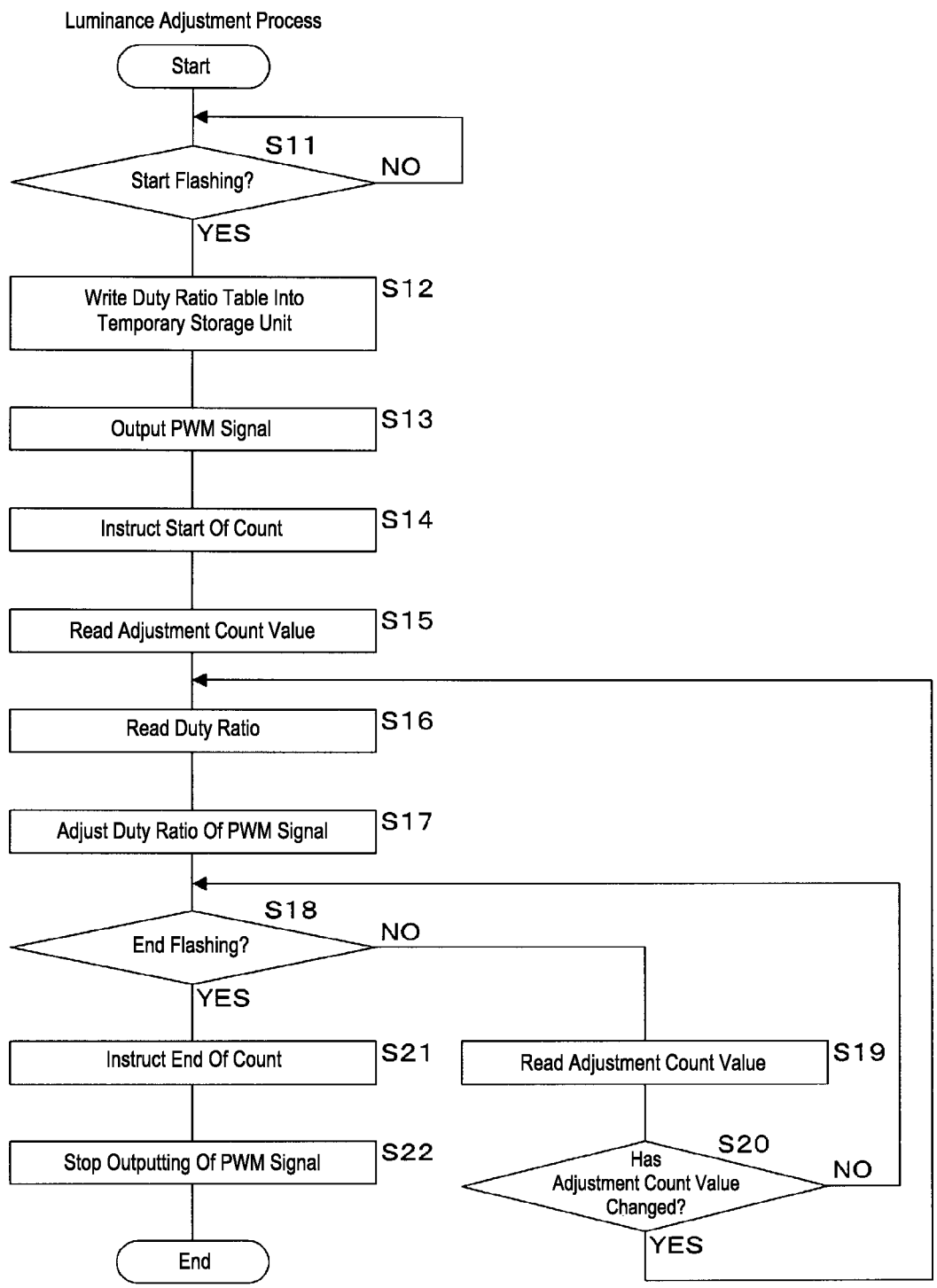
FIG. 10 is a flowchart depicting the procedure of a luminance adjustment process.

FIG. 10 is a flowchart depicting the procedure of the luminance adjustment process. In the luminance adjustment process, the control unit 36 of the individual ECU 3*a* determines whether to start flashing one or a plurality of the lamps 40 (step S11). In step S11, when the communication unit 31 has received instruction data indicating the start of flashing of the lamp(s) 40 from the communication unit 21*a* of the integrated ECU 2, the control unit 36 determines to start flashing of one or a plurality of the lamps 40. When the communication unit 31 has not received instruction data indicating the start of flashing of one or a plurality of the lamps 40, the control unit 36 determines that flashing is not to start.

When the control unit 36 has determined that flashing is not to start (S11: NO), the control unit 36 executes step S11 again and waits until the communication unit 31 receives instruction data indicating the start of flashing of the lamp(s) 40. When the control unit 36 has determined that the flashing is to start (S11: YES), the control unit 36 writes the duty ratio table Tc stored in the storage unit 35 into the temporary storage unit 34 (step S12). In the synchronization process, the control unit 36 temporarily changes a plurality of duty ratios indicated in the duty ratio table Tc. After this, the control unit 36 restores the plurality of duty ratios indicated in the duty ratio table Tc to the original values. To do so, the control unit 36 executes step S12.

After executing step S12, the control unit 36 instructs the signal output unit 32 to output the PWM signal to one or a plurality of the lamps 40 (step S13). Next, the control unit 36 instructs the adjustment counter 30 to start the count (step S14). As a result, the adjustment counter 30 starts the count. The adjustment count value increases by one from zero every time the count cycle elapses. Next, the control unit 36 reads the adjustment count value from the adjustment counter (step S15). The adjustment count value read by the control unit 36 in step S15 is zero.

Next, the control unit 36 reads out the duty ratio corresponding to the adjustment count value read out in step S15 in the duty ratio table Tc stored in the temporary storage unit 34 (step S16). Next, the control unit 36 adjusts the duty ratio of the PWM signal outputted by the signal output unit 32 to the duty ratio read out in step S16 (step S17).

The control unit 36 determines whether to end the flashing of one or a plurality of the lamps 40 (step S18). In step S18, when the communication unit 31 has received instruction data indicating the end of flashing of the lamp(s) 40 from the communication unit 21*a* of the integrated ECU 2, the control unit 36 determines to end the flashing of one or a plurality of the lamps 40. When the communication unit 31 has not received instruction data indicating the end of the flashing of one or a plurality of the lamps 40, the control unit 36 determines to not end the flashing.

When the control unit 36 has determined to not end the flashing (S18: NO), the control unit 36 reads the adjustment count value from the adjustment counter 30 (step S19). After executing step S19, the control unit 36 determines whether the adjustment count value of the adjustment counter 30 has changed (step S20). When the two most recent adjustment count values read from the adjustment counter 30 are respectively different, the control unit 36 determines that the adjustment count value has changed. When the two most recent adjustment count values read from the adjustment counter 30 are the same, the control unit 36 determines that the adjustment count value has not changed.

When the control unit 36 has determined that the adjustment count value has not changed (S20: NO), the control unit 36 executes step S18, and the communication unit 31 receives instruction data indicating the end of flashing of the lamp(s) 40, or waits until the adjustment count value changes. When the control unit 36 has determined that the adjustment count value has changed (S20: YES), the control unit 36 executes step S16 again to change the duty ratio of the PWM signal.

When the control unit 36 has determined to end the flashing (S18: YES), the control unit 36 instructs the adjustment counter 30 to end the count (step S21). As a result, the adjustment counter 30 ends the count. After executing step S21, the control unit 36 instructs the signal output unit 32 to stop the outputting of the PWM signal (step S22). After executing step S22, the control unit 36 ends the luminance adjustment process. After the luminance adjustment process has ended, the control unit 36 executes the luminance adjustment process again, and waits until the communication unit 31 receives instruction data indicating the start of flashing of the lamp(s) 40.

The duty ratio table Tc stored in the temporary storage unit 34 is fundamentally the same as the duty ratio table Tc stored in the storage unit 35. The adjustment count value repeats a transition from zero to the integer Nc (=0). To do so, in the luminance adjustment process, as a basic operation, the control unit 36 repeatedly adjusts the luminance value of one or a plurality of the lamps 40 according to the duty ratio table Tc stored in the storage unit 35, that is, according to the luminance pattern depicted in FIG. 8. Each of the control units 36 of the four individual ECUs 3*a* executes this luminance adjustment process. As a result, adjustment of the luminance value according to the luminance pattern is repeated for the four lamps 40.

Note that in the synchronization process, the duty ratio table Tc stored in the temporary storage unit 34 may be temporarily changed. Synchronization is realized by changing the adjustment count values in the four adjustment counters 30 included in the four individual ECUs 3*a* to a common value. These four adjustment count values can become out of sync from the other adjustment count values due to various factors.

Synchronization Process

Figure 11:
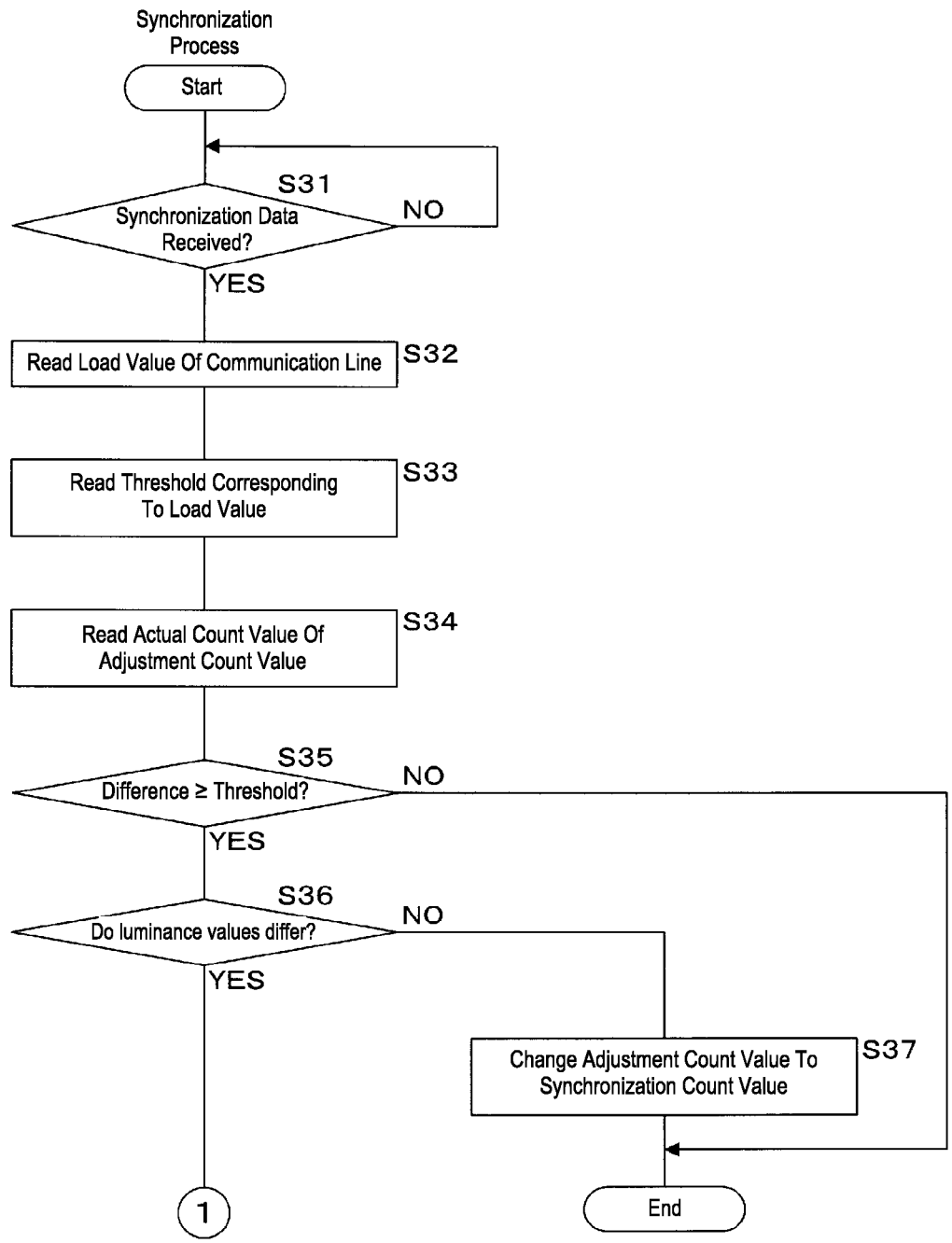
FIG. 11 is a flowchart depicting the procedure of a synchronization process.
Figure 12:
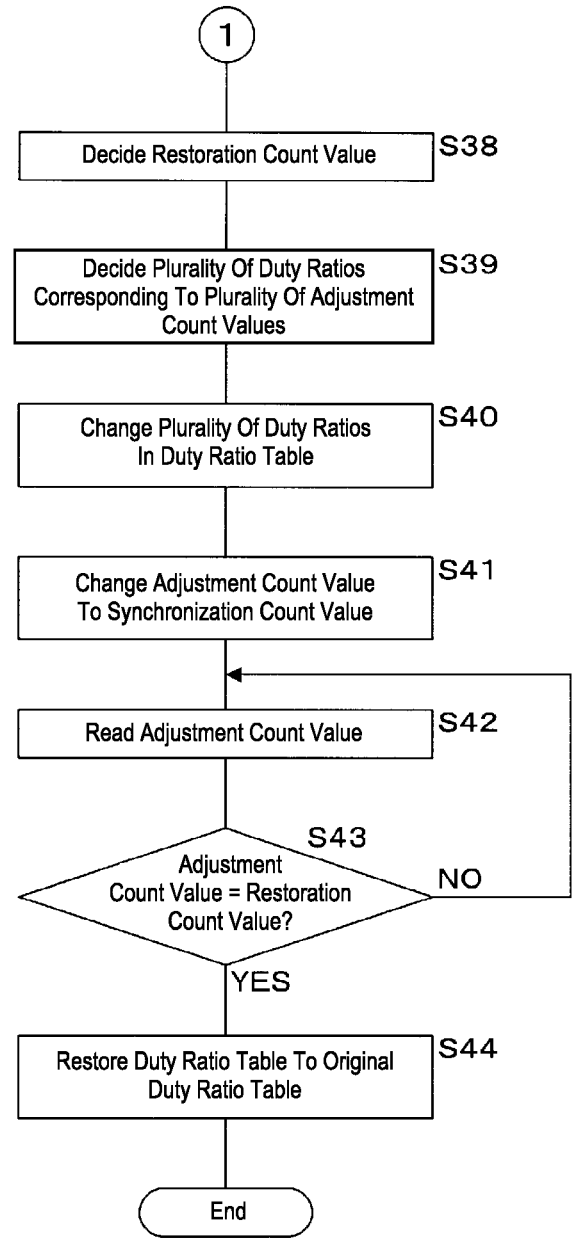
FIG. 12 is a flowchart depicting the procedure of a synchronization process.

FIGS. 11 and 12 are flowcharts depicting the procedure of the synchronization process. In the synchronization process, the control unit 36 determines whether the communication unit 31 has received synchronization data (step S31). When the communication unit 31 has received synchronization data, the control unit 36 acquires the synchronization data transmitted from the communication unit 31 via the communication line Lc. Accordingly, reception of the synchronization data performed by the communication unit 31 corresponds to acquisition of the synchronization data performed by the control unit 36. Acquisition of synchronization data corresponds to acquisition of a synchronization count value. When the control unit 36 has determined that the communication unit 31 has not received the synchronization data (S31: NO), the control unit 36 executes step S31 again and waits until the communication unit 31 receives the synchronization data.

When the control unit 36 has determined that the communication unit 31 has received the synchronization data (S31: YES), the control unit 36 reads out the load value of the communication line Lc from the communication unit 31 (step S32). The control unit 36 reads the threshold corresponding to the load value read out in step S32 in the threshold table Th (step S33). As described earlier, in the threshold table Th, the higher the load value of the communication line Lc, the higher the value of the threshold. After this, the control unit 36 reads the actual count value of the adjustment count value, which is stored in the adjustment counter 30, from the adjustment counter 30 (step S34).

As described earlier, the adjustment count value stored in the adjustment counter 30 increases by one from zero every time the count cycle elapses. In the luminance adjustment process, the luminance value of one or a plurality of the lamps 40 is adjusted to a luminance value in keeping with the adjustment count value. Accordingly, both the adjustment count value stored in the adjustment counter 30 and the actual count value read by the control unit 36 in step S34 correspond to the actual value of the elapsed time during the luminance cycle.

Next, the control unit 36 determines whether the difference between the synchronization count value indicated by the synchronization data received by the communication unit 31 and the actual count value read in step S34 is equal to or greater than the threshold read in step S33 (step S35). In the following description of the synchronization process, the synchronization count value indicated by the synchronization data received by the communication unit 31 is referred to simply as the "synchronization count value".

As described earlier, in the integrated ECU 2, when the three communication units 21*a* have transmitted instruction data indicating the start of flashing of the lamps 40, the synchronization counter 20 starts the count. Each of the synchronization count value and the adjustment count value increases by one from zero every time a count cycle elapses. If the synchronization count value is incremented by one in a state where the synchronization count value is Nc-1, the synchronization count value returns to zero. In the same way, when the adjustment count value is incremented by one in a state where the adjustment count value is Nc-1, the adjustment count value returns to zero. Accordingly, the synchronization count value is a time value relating to the luminance pattern.

As described earlier, each of the three communication units 21*a* of the integrated ECU 2 transmits synchronization data to the communication units 31 of the three individual ECUs 3*a*. This means that the integrated ECU 2 functions as a transmission apparatus. The control system 1 functions as a luminance adjustment system.

When the control unit 36 has determined that the difference is equal to or greater than a threshold (S35: YES), the control unit determines whether the luminance value (duty ratio) corresponding to the synchronization count value in the duty ratio table Tc stored in the temporary storage unit 34 differs from the luminance value (duty ratio) corresponding to the actual count value in the shared duty ratio table Tc (step S36).

When the control unit 36 has determined that the luminance value corresponding to the synchronization count value is the same as the luminance value corresponding to the actual count value (S36: NO), the control unit 36 changes the adjustment count value stored in the adjustment counter 30 to the synchronization count value indicated by the synchronization data received by the communication unit 31 (step S37). By doing so, synchronization is achieved. The luminance value corresponding to the synchronization count value corresponds to a "first luminance value". The luminance value corresponding to the actual count value corresponds to a "second luminance value".

Note that when the adjustment count value has changed, the adjustment counter 30 does not start the clock for detecting the elapsing of the count cycle from zero again.

On determining that the difference is less than the threshold (S35: NO) or after the step S37 has been executed, the control unit 36 ends the synchronization process. After the synchronization process has ended, the control unit 36 executes the synchronization process again and waits until the communication unit 31 receives the synchronization data.

On determining that the luminance value corresponding to the synchronization count value is different from the luminance value corresponding to the actual count value (S36: YES), the control unit 36 decides a restoration count value based on the actual count value and the synchronization count value (step S38). The restoration count value corresponds to a "second time value".

When the two luminance values differ and the adjustment count value stored in the adjustment counter 30 has been changed to the synchronization count value, the luminance value of a lamp 40 will greatly change, which may appear strange to someone looking at the lamp 40. In this case, in the duty ratio table Tc stored in the temporary storage unit 34, the luminance value (duty ratio) corresponding to the synchronization count value is changed to the luminance value (duty ratio) corresponding to the actual count value, and as the adjustment count value increases, the luminance value (duty ratio) of the luminance pattern depicted in FIG. 8 is restored. The restoration count value is an adjustment count value that restores the luminance value (duty ratio) of the lamp(s) 40 to the duty ratio in the duty ratio table Tc stored in the storage unit 35, that is, the luminance value (duty ratio) of the luminance pattern depicted in FIG. 8.

After executing step S38, the control unit 36 decides, in the duty ratio table Tc stored in the temporary storage unit 34, a plurality of duty ratio values corresponding to a plurality of adjustment count values from the synchronization count value to an adjustment count value immediately before the restoration count value (step S39). The method of deciding this plurality of duty ratio values will be described later. The luminance value corresponding to the synchronization count value is decided at a luminance value corresponding to the actual count value. Next, the control unit 36 changes the plurality of duty ratio values in the duty ratio table Tc stored in the temporary storage unit 34 to the plurality of duty ratio values decided in step S39 (step S40). By doing so, a plurality of luminance values (duty ratios) in a luminance pattern from the synchronization count value to the value immediately before the restoration value determined in step S38 are changed.

After executing step S40, the control unit 36 changes the adjustment count value stored in the adjustment counter 30 to the synchronization count value indicated by the synchronization data received by the communication unit 31 (step S41). By doing so, in the luminance adjustment process, the luminance value of a lamp 40 is sequentially adjusted according to the changed duty ratio table Tc from the luminance value (duty ratio) corresponding to the synchronization count value. Next, the control unit 36 reads the adjustment count value from the adjustment counter 30 (step S42). After this, the control unit 36 determines whether the adjustment count value read in step S42 matches the restoration count value decided in step S38 (step S43).

On determining that the adjustment count value is different from the restoration count value (S43: NO), the control unit 36 executes step S42 again and waits until the adjustment count value of the adjustment counter 30 matches the restoration count value. On determining that the adjustment count value matches the restoration count value (S43: YES), the control unit 36 restores the duty ratio table Tc stored in the temporary storage unit 34 to the original duty ratio table Tc stored in the storage unit 35 (step S44). After executing step S44, the control unit 36 ends the synchronization process. After ending the synchronization process, the control unit 36 executes the synchronization process again and waits until the communication unit 31 receives the synchronization data.

First Example of Changing Luminance Values (Duty Ratios)

Figure 13:
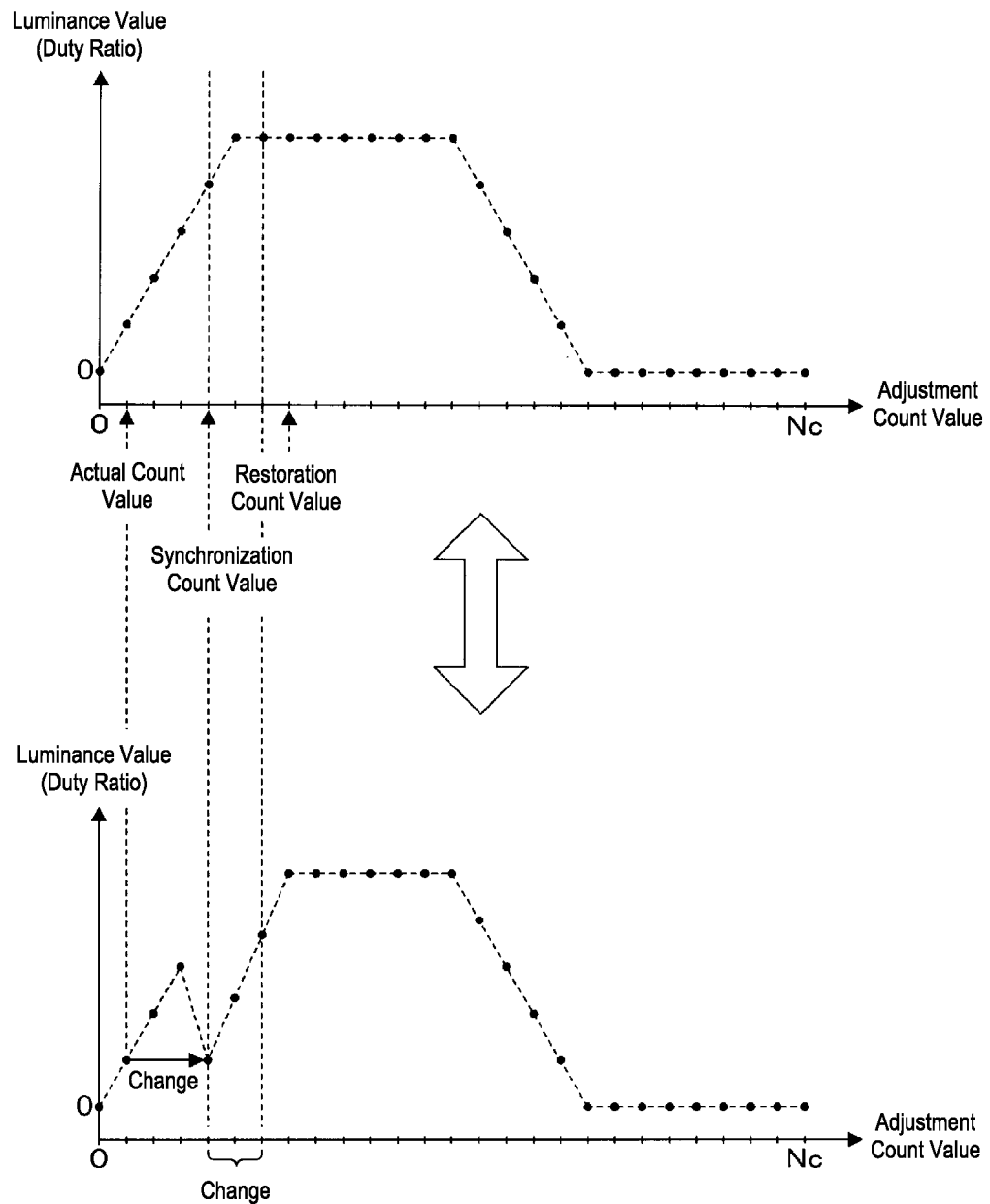
FIG. 13 is a diagram useful in explaining a first example of changing luminance values.

FIG. 13 is a diagram useful in explaining a first example of changing luminance values. FIG. 13 depicts Nc luminance values (duty ratios) corresponding to Nc adjustment count values. In the upper part of FIG. 13, Nc luminance values corresponding to the duty ratio table Tc before execution of step S40 of the synchronization process are depicted. In the lower part of FIG. 13, Nc luminance values corresponding to the duty ratio table Tc after execution of step S40 of the synchronization process are depicted.

In the example of FIG. 13, the synchronization count value exceeds the actual count value, and the luminance value corresponding to the synchronization count value is larger than the luminance value corresponding to the actual count value. In this case, if the adjustment count value stored in the adjustment counter were changed to the synchronization count value without changing the duty ratios (luminance values) in the duty ratio table Tc, the luminance value of the lamp would sharply increase. This may appear strange to someone looking at the lamp 40.

For this reason, in step S38 of the synchronization process, when the synchronization count value exceeds the actual count value, the control unit 36 decides the restoration count value at a larger value than the synchronization count value. As depicted in the lower part of FIG. 13, in step S40 of the synchronization process, the control unit 36 changes the luminance value corresponding to the synchronization count value in the duty ratio table Tc to a luminance value corresponding to the actual count value. In addition, the control unit 36 changes one or a plurality of luminance values (duty ratios) corresponding to the adjustment count value following after the synchronization count value to the adjustment count value immediately before the restoration count value. In more detail, the control unit 36 changes one or a plurality of luminance values (duty ratios) so that the luminance of the lamp 40 gradually changes from a luminance value corresponding to the synchronization count value to reach a luminance value corresponding to the restoration count value. By doing so, the luminance value of the lamp 40 returns to the luminance value of the luminance pattern depicted in the upper part of FIG. 13 without greatly changing.

When the adjustment count value has reached the restoration count value, the duty ratio table Tc stored in the temporary storage unit 34 is returned to the original duty ratio table Tc stored in the storage unit 35. In FIG. 13, the duty ratio table Tc stored in the temporary storage unit 34 is returned from the duty ratio table Tc corresponding to the luminance pattern in the lower part to the duty ratio table Tc corresponding to the luminance pattern in the upper part.

In the example of FIG. 13, the restoration count value is decided at a value obtained by adding a difference between the synchronization count value and the actual count value to the synchronization count value.

Second Example of Changing Luminance Values (Duty Ratios)

Figure 14:
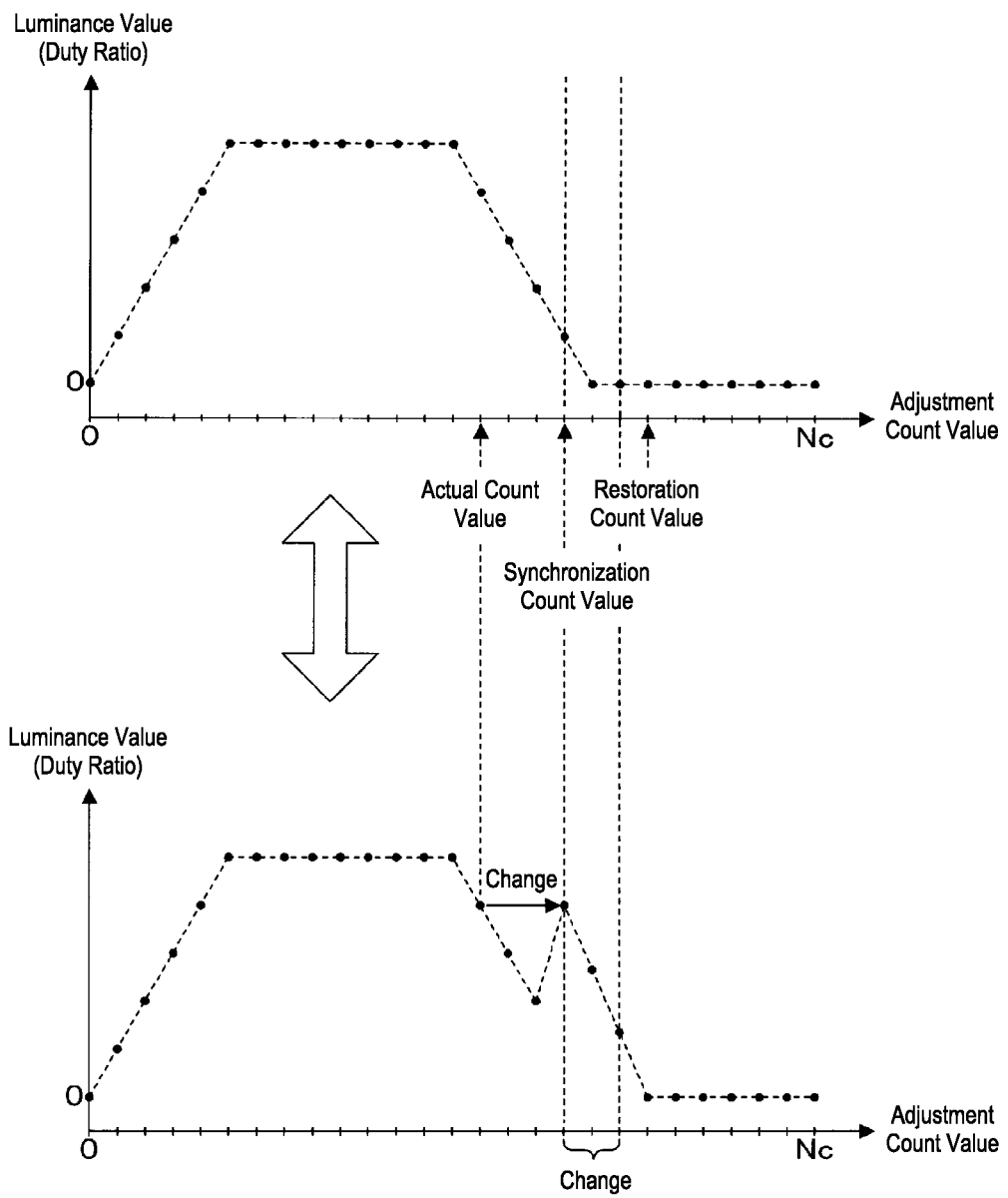
FIG. 14 is a diagram useful in explaining a second example of changing luminance values.

FIG. 14 is a diagram useful in explaining a second example of changing luminance values. FIG. 14 depicts Nc luminance values (duty ratios) corresponding to Nc adjustment count values. In the same way as FIG. 13, the upper part and the lower part of FIG. 14 respectively depict Nc luminance values corresponding to the duty ratio table Tc before execution of step S40 of the synchronization process and Nc luminance values corresponding to the duty ratio table Tc after execution of step S40 of the synchronization process.

In the example in FIG. 14, the synchronization count value exceeds the actual count value, and the luminance value corresponding to the synchronization count value is smaller than the luminance value corresponding to the actual count value. In this case, if the adjustment count value stored in the adjustment counter 30 were changed to the synchronization count value without changing the duty ratios (luminance values) in the duty ratio table Tc, the luminance value of the lamp 40 would sharply decrease. This may appear strange to someone looking at the lamp 40.

For this reason, in step S38 of the synchronization process, when the synchronization count value exceeds the actual count value, the control unit 36 decides the restoration count value at a larger value than the synchronization count value. As depicted in the lower part of FIG. 14, in step S40 of the synchronization process, the control unit 36 changes the luminance value corresponding to the synchronization count value in the duty ratio table Tc to a luminance value corresponding to the actual count value. In addition, the control unit 36 changes one or a plurality of luminance values (duty ratios) corresponding to the adjustment count value following after the synchronization count value to the adjustment count value immediately before the restoration count value. In more detail, the control unit 36 changes one or a plurality of luminance values (duty ratios) so that the luminance of the lamp 40 gradually changes from a luminance value corresponding to the synchronization count value to reach a luminance value corresponding to the restoration count value. By doing so, the luminance value of the lamp 40 returns to the luminance value of the luminance pattern depicted in the upper part of FIG. 14 without greatly changing.

When the adjustment count value has reached the restoration count value, the duty ratio table Tc stored in the temporary storage unit 34 is restored to the original duty ratio table Tc stored in the storage unit 35. In FIG. 14, the duty ratio table Tc stored in the temporary storage unit 34 is restored from the duty ratio table Tc corresponding to the luminance pattern in the lower part to the duty ratio table Tc corresponding to the luminance pattern in the upper part.

In the example of FIG. 14, in the same way as in FIG. 13, the restoration count value is decided at a value obtained by adding a difference between the synchronization count value and the actual count value to the synchronization count value.

Third Example of Changing Luminance Values (Duty Ratios)

Figure 15:
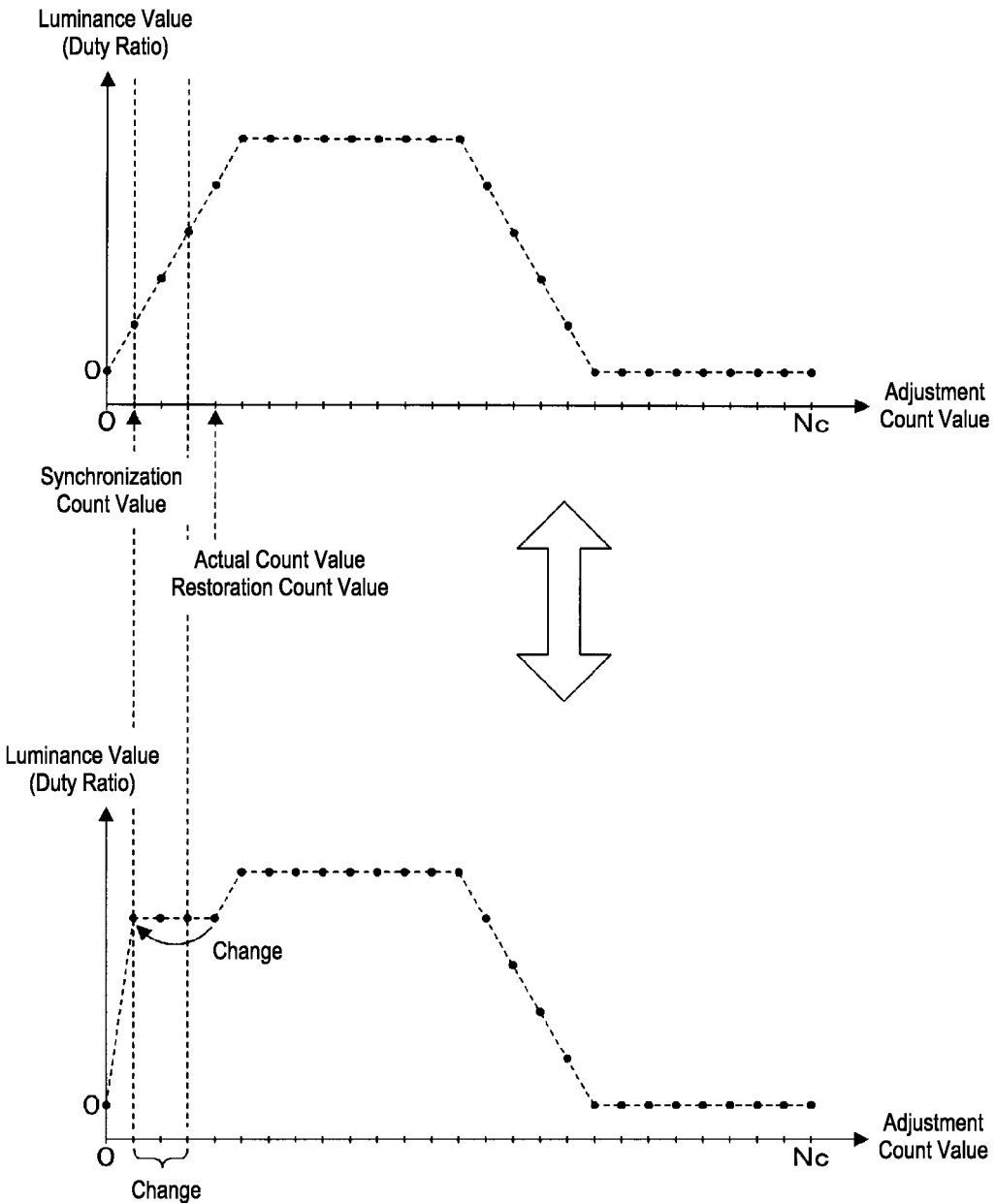
FIG. 15 is a diagram useful in explaining a third example of changing luminance values.

FIG. 15 is a diagram useful in explaining a third example of changing luminance values. FIG. 15 depicts Nc luminance values (duty ratios) corresponding to Nc adjustment count values. In the same way as in FIGS. 13 and 14, the upper part and the lower part of FIG. 15 respectively depict Nc luminance values corresponding to the duty ratio table Tc before execution of step S40 in the synchronization process and Nc luminance values corresponding to the duty ratio table Tc after execution of step S40 in the synchronization process.

In the example in FIG. 15, the synchronization count value is less than the actual count value and the luminance value corresponding to the synchronization count value is larger than the luminance value corresponding to the actual count value. In this case, if the adjustment count value stored in the adjustment counter 30 were changed to the synchronization count value without changing the duty ratios (luminance values) in the duty ratio table Tc, the luminance value of the lamp 40 would sharply decrease. This may appear strange to someone looking at the lamp 40.

For this reason, in step S38 of the synchronization process, when the synchronization count value is less than the actual count value, the control unit 36 decides the restoration count value at the actual count value. In step S40 of the synchronization process, as depicted in the lower part of FIG. 15, the control unit 36 changes the luminance value corresponding to the synchronization count value in the duty ratio table Tc to the luminance value corresponding to the actual count value. In addition, the control unit 36 changes one or a plurality of luminance values (duty ratios), which correspond to the adjustment count value following the synchronization count value to the adjustment count value immediately before the restoration count value, to the luminance value corresponding to the synchronization count value. By doing so, the luminance value of the lamp 40 returns to the luminance value of the luminance pattern depicted in the upper part of FIG. 15 without greatly changing.

When the adjustment count value has reached the restoration count value, the duty ratio table Tc stored in the temporary storage unit 34 is restored to the original duty ratio table Tc stored in the storage unit 35. In FIG. 15, the duty ratio table Tc stored in the temporary storage unit 34 is restored from the duty ratio table Tc corresponding to the luminance pattern in the lower part to the duty ratio table Tc corresponding to the luminance pattern in the upper part.

Fourth Example of Changing Luminance Values (Duty Ratios)

Figure 16:
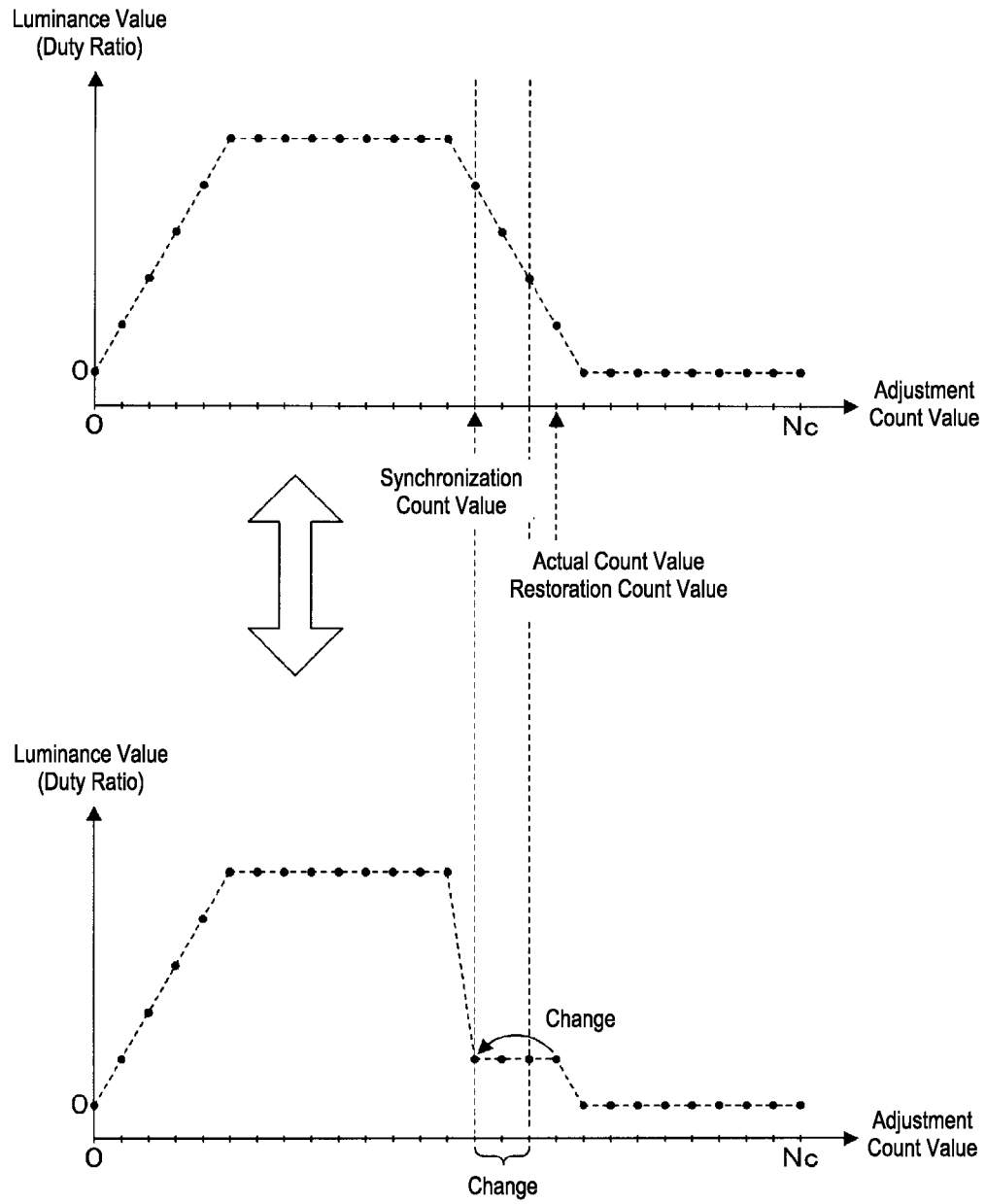
FIG. 16 is a diagram useful in explaining a fourth example of changing luminance values.

FIG. 16 is a diagram useful in explaining a fourth example of changing luminance values. FIG. 16 depicts Nc luminance values (duty ratios) corresponding to Nc adjustment count values. In the same way as in FIGS. 13 to 15, the upper part and the lower part of FIG. 16 respectively depict Nc luminance values corresponding to the duty ratio table Tc before execution of step S40 of the synchronization process and Nc luminance values corresponding to the duty ratio table Tc after execution of step S40 of the synchronization process.

In the example in FIG. 16, the synchronization count value is less than the actual count value, and the luminance value corresponding to the synchronization count value is smaller than the luminance value corresponding to the actual count value. In this case, if the adjustment count value stored in the adjustment counter 30 were changed to the synchronization count value without changing the duty ratios (luminance values) in the duty ratio table Tc, the luminance value of the lamp 40 would rapidly increase. This may appear strange to someone looking at the lamp 40.

For this reason, in step S38 of the synchronization process, when the synchronization count value is less than the actual count value, the control unit 36 sets the restoration count value at the actual count value. In step S40 of the synchronization process, as depicted in the lower part of FIG. 16, the control unit 36 changes the luminance value corresponding to the synchronization count value in the duty ratio table Tc to the luminance value corresponding to the actual count value. In addition, the control unit 36 changes one or a plurality of luminance values (duty ratios), which correspond to the adjustment count value following the synchronization count value to the adjustment count value immediately before the restoration count value, to the luminance value corresponding to the synchronization count value. By doing so, the luminance value of the lamp 40 returns to the luminance value of the luminance pattern depicted in the upper part of FIG. 16 without greatly changing.

When the adjustment count value has reached the restoration count value, the duty ratio table Tc stored in the temporary storage unit 34 is restored to the original duty ratio table Tc stored in the storage unit 35. In FIG. 16, the duty ratio table Tc stored in the temporary storage unit 34 is restored from the duty ratio table Tc corresponding to the luminance pattern in the lower part to the duty ratio table Tc corresponding to the upper luminance pattern in the upper part.

Note that when the two luminance values (duty ratios) corresponding to the synchronization count value and the actual count value are the same, the adjustment count value stored in the adjustment counter 30 is changed to the synchronization count value without changing the duty ratio table Tc stored in the temporary storage unit 34.

Effects of Control System 1 and Individual ECUs 3a

As described above, when the three individual ECUs 3a receive the synchronization data from the integrated ECU 2, the adjustment count value stored in the adjustment counter 30 is changed to the synchronization count value indicated by the received synchronization data. By doing so, it is possible to achieve synchronization relating to adjustment of the luminance values of the four lamps performed by the three individual ECUs 3a.

When the load value of a communication line Lc is high, the propagation time of the synchronization data from the integrated ECU 2 to the individual ECU 3a is long, and the reliability of the synchronization count value indicated by the synchronization data is low. For this reason, as described earlier, at each individual ECU 3a, the higher the load value of the communication line Lc, the higher the threshold that is used. As a result, when the load value of the communication line Lc is high, there is low probability that the adjustment count value stored in the adjustment counter 30 will be changed using the synchronization count value indicated by the synchronization data.

Second Embodiment

In the first embodiment, synchronization is realized by changing the adjustment count value stored in the adjustment counter 30 to the synchronization count value indicated by the synchronization data. However, the method of realizing synchronization is not limited to a method that changes the adjustment count value to the synchronization count value.

Hereinafter, the differences between a second embodiment and the first embodiment will be described. Configurations aside from those described below are the same as in the first embodiment. For this reason, the same reference numerals as the first embodiment have been assigned to components that are the same as in the first embodiment, and description of such components is omitted.

Synchronization Process

Figure 17:
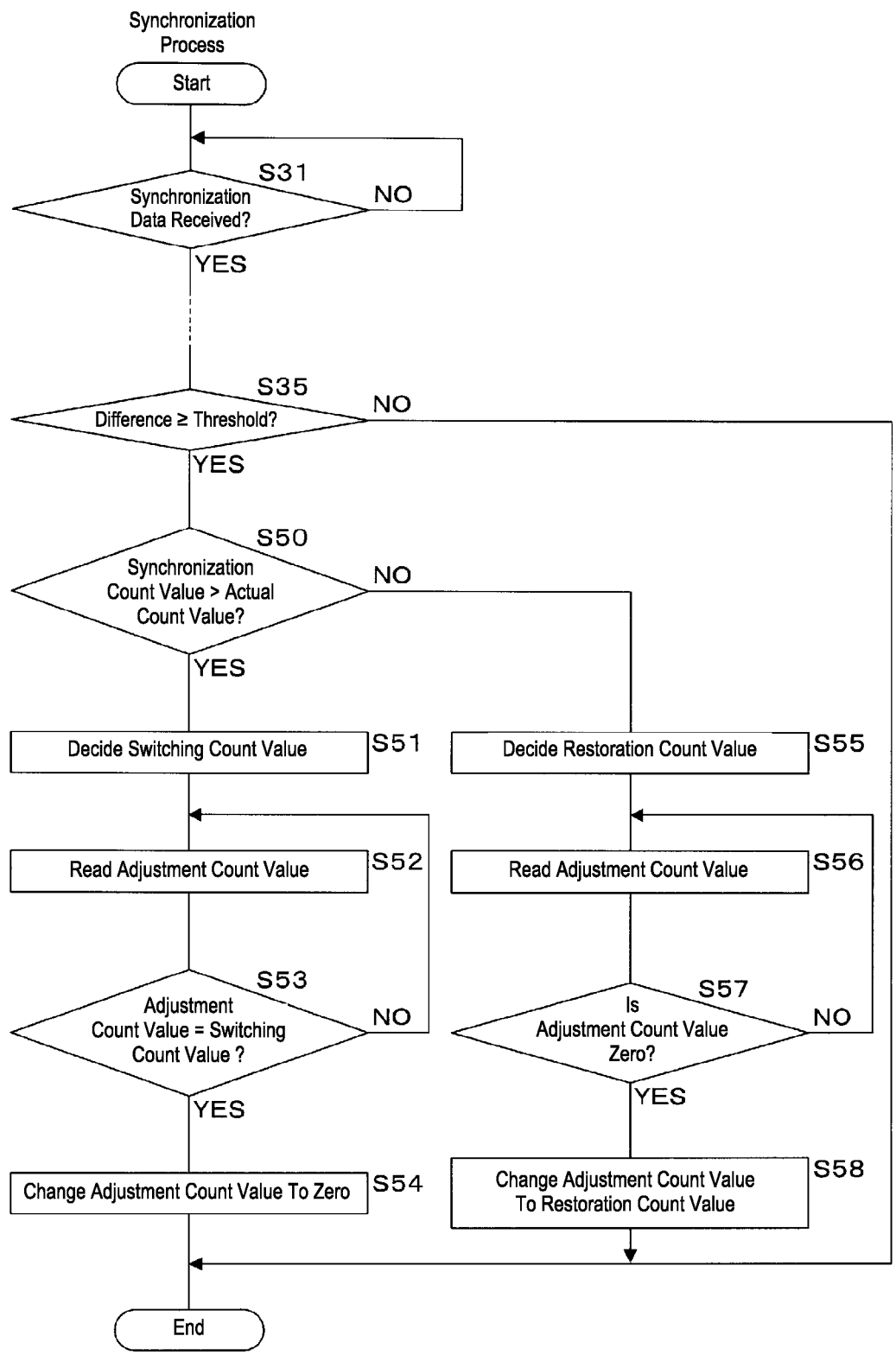
FIG. 17 is a flowchart depicting the procedure of a synchronization process according to a second embodiment.

FIG. 17 is a flowchart depicting the procedure of the synchronization process in the second embodiment. Parts of the synchronization process in the second embodiment are the same as parts of the synchronization process in the first embodiment. For this reason, steps in the synchronization process in the second embodiment that are the same as steps in the synchronization process in the first embodiment have been assigned the same reference numerals and detailed description of such steps is omitted. More specifically, detailed description of steps S31 to S35 is omitted. In the description of the synchronization process in the second embodiment also, the synchronization count value indicated by the synchronization data received by the communication unit 31 is indicated simply as the "synchronization count value". As described in the explanation of the first embodiment, the control unit 36 of each individual ECU 3a executes a vehicle data transmission process, a luminance adjustment process, a synchronization process, and the like.

In the synchronization process according to the second embodiment, when the control unit 36 of the individual ECU 3a has determined that the difference between the synchronization count value and the actual count value read in step S34 is equal to or greater than the threshold read in step S33 (S35: YES), the control unit 36 determines whether the synchronization count value exceeds the actual count value (step S50). As described in the explanation of the first embodiment, the threshold is one or higher. For this reason, when step S50 has been executed, the synchronization count value will never be equal to the actual count value. Accordingly, in step S50, the synchronization count value not exceeding the actual count value means that the synchronization count value is less than the actual count value.

When the control unit 36 has determined that the synchronization count value exceeds the actual count value (S50: YES), the control unit 36 decides a switching count value which indicates timing where the adjustment count value stored in the adjustment counter 30 switches to zero. (Step S51). In step S51, the switching count value is decided at a value obtained by subtracting the difference between the synchronization count value and the actual count value from the integer Nc.

After executing step S51, the control unit 36 reads out the adjustment count value stored in the adjustment counter 30 (step S52) and determines whether the read adjustment count value matches the switching count value decided in step S51 (step S53). When the control unit 36 has determined that the adjustment count value does not match the switching count value (S53: NO), the control unit 36 executes step S52 again and waits until the adjustment count value matches the switching count value. Since the luminance adjustment process is executed in parallel with the synchronization process, the adjustment count value is incremented by one at a time as time passes.

When the control unit 36 has determined that the adjustment count value matches the switching count value (S53: YES), the control unit 36 changes the adjustment count value stored in the adjustment counter 30 to zero (step S54). As a result, in the luminance adjustment process, the luminance value (duty ratio) of one or a plurality of the lamps 40 sequentially changes from the luminance value when the adjustment count value is zero.

When the synchronization count value does not exceed the actual count value (S50: NO), the control unit 36 decides a restoration count value, which is a target value for the adjustment count value that changes when the adjustment count value has reached zero (step S55). In step S55, the restoration count value is set at a value obtained by subtracting the difference between the synchronization count value and the actual count value from the integer Nc.

After executing step S55, the control unit 36 reads out the adjustment count value stored in the adjustment counter 30 (step S56), and determines whether the read adjustment count value is zero, that is, an integer Nc (step S57). When the control unit 36 has determined that the adjustment count value is not zero (S57: NO), the control unit 36 executes step S56 again and waits until the adjustment count value matches zero. As described earlier, since the luminance adjustment process is executed in parallel with the synchronization process, the adjustment count value increases by one at a time as time passes.

When the control unit 36 has determined that the adjustment count value is zero (S57: YES), the control unit 36 changes the adjustment count value stored in the adjustment counter 30 to the restoration count value (step S58). As a result, in the luminance adjustment process, the luminance value (duty ratio) of one or a plurality of the lamps 40 sequentially changes from the luminance value when the adjustment count value is the restoration count value. The control unit 36 ends the synchronization process on determining that the difference is less than the threshold value (S35: NO) or after executing one of steps S54 and S58. After the synchronization process ends, the control unit 36 executes the synchronization process again and waits until the communication unit 31 receives the synchronization data.

Note that in the synchronization process in the second embodiment, it is not necessary to change the duty ratios (luminance values) indicated in the duty ratio table Tc. This means that the control unit 36 of an individual ECU 3a may refer to the duty ratio table Tc stored in the storage unit 35 instead of referring to the duty ratio table Tc stored in the temporary storage unit 34.

First Example of Changing the Adjustment Count Value

Figure 18:
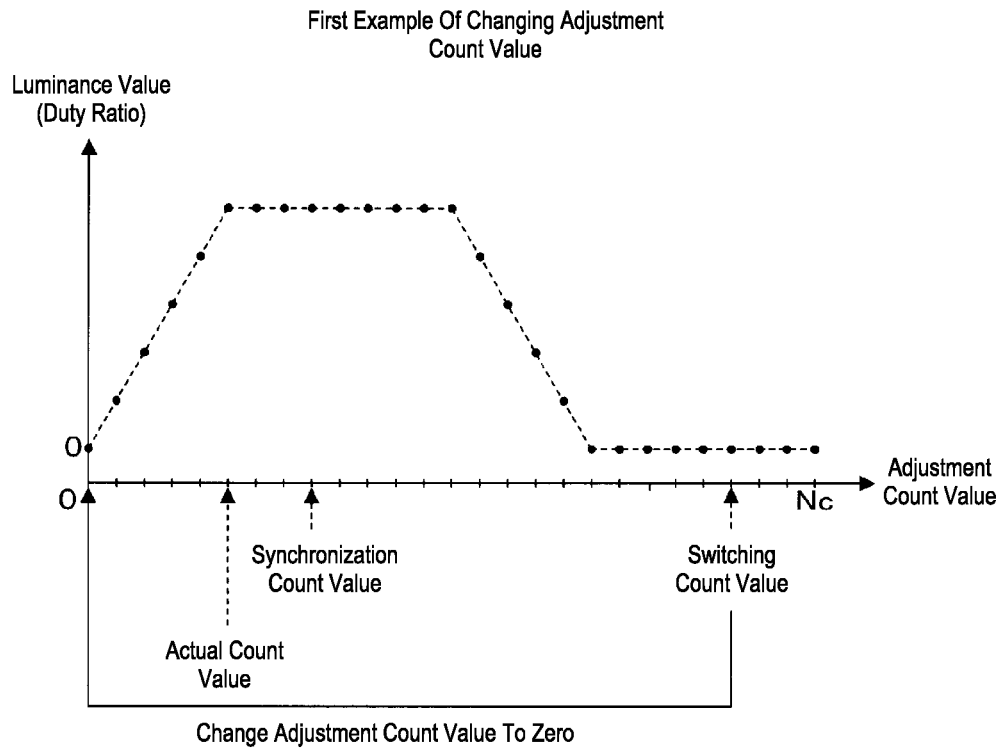
FIG. 18 is a diagram useful in explaining a first example of changing an adjustment count value.

FIG. 18 is a diagram useful in explaining a first example of changing the adjustment count value. In FIG. 18, Nc luminance values (duty ratios) corresponding to Nc adjustment count values are depicted. These Nc luminance values (duty ratios) are changed according to the luminance pattern.

In the example of FIG. 18, the synchronization count value exceeds the actual count value. The difference between the synchronization count value and the actual count value is three. For this reason, the control unit 36 of the individual ECU 3a decides the switching count value at (Nc−3). When the adjustment count value stored in the adjustment counter 30 has reached the switching count value, the control unit 36 changes the adjustment count value to zero. As a result, the adjustment count value of the adjustment counter 30 of the individual ECU 3a matches the synchronization count value of the synchronization counter 20 of the integrated ECU 2. Synchronization is achieved by shortening the fourth period, that is, the period during which the luminance value is maintained at zero.

Second Example of Changing the Adjustment Count Value

Figure 19:
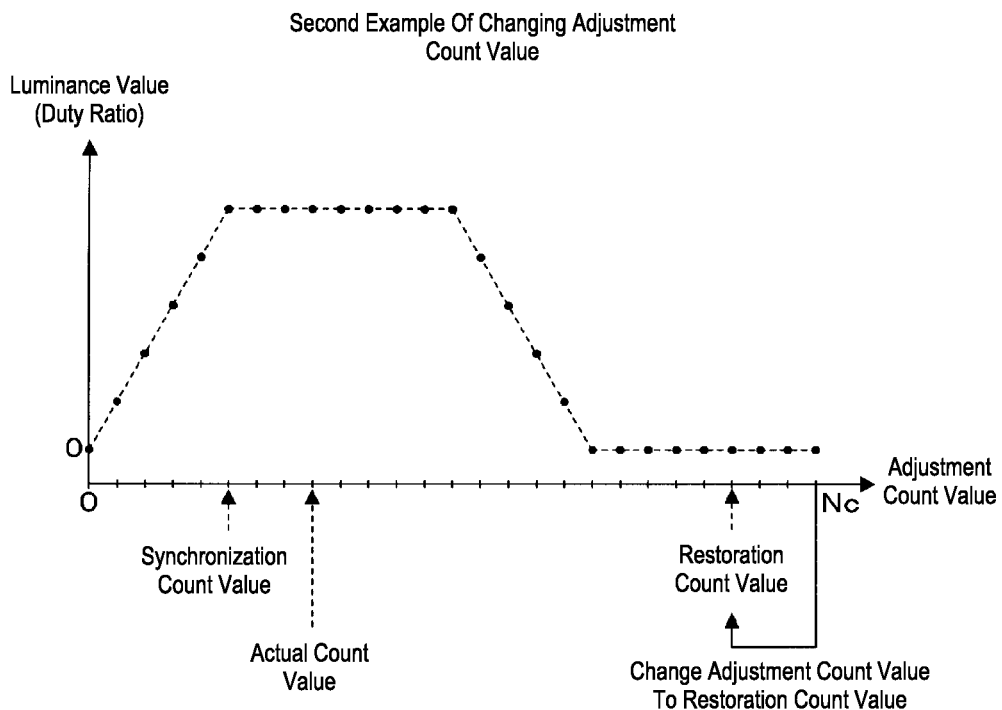
FIG. 19 is a diagram useful in explaining a second example of changing an adjustment count value.

FIG. 19 is a diagram useful in explaining a second example of changing the adjustment count value. In FIG. 19, Nc luminance values (duty ratios) corresponding to Nc adjustment count values are depicted. These Nc luminance values (duty ratios) are changed according to the luminance pattern.

In the example in FIG. 19, the synchronization count value exceeds the actual count value. The difference between the synchronization count value and the actual count value is three. For this reason, the control unit 36 of the individual ECU 3a decides the restoration count value at (Nc−3). When the adjustment count value stored in the adjustment counter 30 has reached zero, that is, the integer Nc (the right end of the luminance pattern), the control unit 36 changes the adjustment count value to the restoration count value. As a result, the adjustment count value of the adjustment counter 30 of the individual ECU 3a matches the synchronization count value of the synchronization counter 20 of the integrated ECU 2. Synchronization is achieved by extending the fourth period, i.e., the period during which the luminance value is maintained at zero.

Effects of Control System 1 and Individual ECU 3a

As described above, in the synchronization process in the second embodiment, the control unit 36 of each individual ECU 3a changes the adjustment count value stored in the adjustment counter 30 to the switching count value or the restoration count value based on the synchronization count value so that the timing at which the luminance cycle of the luminance pattern ends changes. As a result, synchronization relating to adjustment of the luminance values of the four lamps 40 is realized.

The control system 1 and the individual ECU 3a according to the second embodiment achieve the same effects as those achieved by the control system 1 and the individual ECU 3a according to the first embodiment, aside from effects obtained by changing the adjustment count value to the synchronization count value.

Example Modifications

In the first and second embodiments, the number of lamps 40 is not limited to four, and may also be two or five or more. Indicator lamps, which flash to indicate a left turn or a right turn of the vehicle C, can be also given as another example of the lamps 40. When two of the lamps 40 are indicator lamps indicating a left turn, for example, the two lamps 40 are disposed at the left front side and the left rear side of the vehicle C. In the same way, when two of the lamps 40 are indicator lamps indicating a right turn, for example, the two lamps 40 are disposed at the right front side and the right rear side of the vehicle C. In this case, as one example, two individual ECUs 3a each adjust the luminance values of two lamps 40. The integrated ECU 2 transmits synchronization data to the two individual ECUs 3a. As a result, synchronization relating to adjustment of the luminance values of two lamps 40 is realized.

The method of adjusting the luminance value of the lamps 40 is not limited to a method of adjusting the duty ratio of a PWM signal. A configuration may also be realized in which the luminance value of a lamp 40 is adjusted by directly adjusting the voltage applied to that lamp 40 or the current flowing through that lamp 40.

In addition, the lamps 40 may also be configured to flash in various colors. As one example, the lamps 40 may be configured to include three LEDs (Light Emitting Diodes) that emit red, green, and blue light.

The number of lamps 40 connected to each individual ECU 3a is not limited to one or two, and may also be three or more. The number of actuators 41 connected to the individual ECU 3b is not limited to one, and may also be two or more. One or more actuators 41 may be connected to each individual ECU 3a.

The integrated ECU 2 and the plurality of individual ECUs 3 may also be connected by a bus. In this case, as one example, a CAN (Controller Area Network) communication protocol is used for the integrated ECU 2 and each of the plurality of individual ECUs 3. The individual ECUs 3a and 3b may each also have a function of distributing electrical power to a plurality of electric devices, such as the lamps 40, the actuator 41, or the sensors 42. Also, the integrated ECU 2 may be a vehicle computer, or functions performed by a vehicle computer may be included in the functions performed by the integrated ECU 2.

All features of the first and second embodiments disclosed here are exemplary and should not be regarded as limitations on the present disclosure. The scope of the present disclosure is indicated by the range of the patent claims, not the description given above, and is intended to include all changes and modifications within the meaning and scope of the patent claims and their equivalents.

The invention claimed is:

1. A luminance adjustment apparatus that adjusts a luminance value of a lamp, comprising:
   a processing unit configured to execute a process,
   wherein the processing unit:
   adjusts the luminance value of the lamp according to a luminance pattern in which luminance values are indicated in keeping with elapsed time in one cycle;
   acquires a time value relating to the luminance pattern; and
   changes an actual value of the elapsed time based on the acquired time value.

2. The luminance adjustment apparatus according to claim 1,
wherein the processing unit:
determines whether a difference between the acquired time value and the actual value is equal to or greater than a threshold; and
changes, when it has been determined that the difference is equal to or greater than the threshold, the actual value based on the acquired time value.

3. The luminance adjustment apparatus according to claim 2,
wherein the processing unit acquires the time value that has been transmitted via a communication line, and
the higher a load value of the communication line, the larger the threshold.

4. The luminance adjustment apparatus according to claim 1,
wherein the processing unit:
determines whether a first luminance value corresponding to the acquired time value differs to a second luminance value corresponding to the actual value;
decides, when it has been determined that the first luminance value differs to the second luminance value, a second time value of the elapsed time;
changes luminance values in the luminance pattern from the acquired time value to just before the decided second time value; and
changes the actual value to the acquired time value.

5. The luminance adjustment apparatus according to claim 4,
wherein the processing unit:
decides, when it has been determined that the first luminance value differs to the second luminance value and the acquired time value exceeds the actual value; the second time value at a larger value than the acquired time value; and
changes luminance values in the luminance pattern from the acquired time value to just before the second time value so that the luminance value of the lamp gradually reaches a luminance value at the second time value from the luminance value of the acquired time value.

6. The luminance adjustment apparatus according to claim 4,
wherein the processing unit:
decides, when it has been determined that the first luminance value differs to the second luminance value and the acquired time value is below the actual value, the second time value at the actual time value; and
changes luminance values in the luminance pattern from the acquired time value to just before the second time value to the luminance value at the actual value.

7. The luminance adjustment apparatus according to claim 1,
wherein the processing unit:
repeatedly adjusts the luminance value of the lamp according to the luminance pattern; and
changes, based on the time value, the actual value so as to change timing at which one cycle of the luminance pattern ends.

8. A luminance adjustment system comprising:
a plurality of luminance adjustment apparatuses configured to adjust luminance values of lamps; and
a transmission apparatus configured to transmit a time value, which relates to a luminance pattern in which luminance values are indicated in keeping with elapsed time in one cycle, to the plurality of luminance adjustment apparatuses,
wherein each luminance adjustment apparatus includes a processing unit configured to execute processing, and
the processing unit in each luminance adjustment apparatus:
adjusts the luminance value of lamps corresponding to the luminance adjustment apparatus out of the plurality of lamps according to the luminance pattern;
acquires the time value transmitted by the transmission apparatus; and
changes an actual value of the elapsed time based on the acquired time value.

9. A luminance adjustment method of adjusting the luminance of a lamp, causing a computer to execute:
a step of adjusting the luminance value of the lamp according to a luminance pattern in which luminance values are indicated in keeping with elapsed time in one cycle;
a step of acquiring a time value relating to the luminance pattern; and
a step of changing an actual value of the elapsed time based on the acquired time value.

10. The luminance adjustment apparatus according to claim 2,
wherein the processing unit:
determines whether a first luminance value corresponding to the acquired time value differs to a second luminance value corresponding to the actual value;
decides, when it has been determined that the first luminance value differs to the second luminance value, a second time value of the elapsed time;
changes luminance values in the luminance pattern from the acquired time value to just before the decided second time value; and
changes the actual value to the acquired time value.

11. The luminance adjustment apparatus according to claim 3,
wherein the processing unit:
determines whether a first luminance value corresponding to the acquired time value differs to a second luminance value corresponding to the actual value;
decides, when it has been determined that the first luminance value differs to the second luminance value, a second time value of the elapsed time;
changes luminance values in the luminance pattern from the acquired time value to just before the decided second time value; and
changes the actual value to the acquired time value.

12. The luminance adjustment apparatus according to claim 5,
wherein the processing unit:
decides, when it has been determined that the first luminance value differs to the second luminance value and the acquired time value is below the actual value, the second time value at the actual time value; and
changes luminance values in the luminance pattern from the acquired time value to just before the second time value to the luminance value at the actual value.

13. The luminance adjustment apparatus according to claim 2,
wherein the processing unit:
repeatedly adjusts the luminance value of the lamp according to the luminance pattern; and
changes, based on the time value, the actual value so as to change timing at which one cycle of the luminance pattern ends.

14. The luminance adjustment apparatus according to claim 3,
   wherein the processing unit:
   repeatedly adjusts the luminance value of the lamp according to the luminance pattern; and
   changes, based on the time value, the actual value so as to change timing at which one cycle of the luminance pattern ends.

* * * * *

UNITED STATES PATENT AND TRADEMARK OFFICE
CERTIFICATE OF CORRECTION

| | | |
|---|---|---|
| PATENT NO. | : 12,324,073 B2 | Page 1 of 1 |
| APPLICATION NO. | : 18/247574 | |
| DATED | : June 3, 2025 | |
| INVENTOR(S) | : Shota Ushiro | |

It is certified that error appears in the above-identified patent and that said Letters Patent is hereby corrected as shown below:

On the Title Page

Item (54) and in the Specification, Column 1, Lines 1-3, The title should read:
LUMINANCE ADJUSTMENT APPARATUS, LUMINANCE ADJUSTMENT SYSTEM, AND LUMINANCE ADJUSTMENT METHOD Signed and Sealed this
Twenty-second Day of July, 2025

Coke Morgan Stewart
*Acting Director of the United States Patent and Trademark Office*